United States Patent
Goto et al.

(10) Patent No.: US 7,280,264 B2
(45) Date of Patent: Oct. 9, 2007

(54) MAGNETO-OPTICAL DEVICE

(75) Inventors: Yuji Goto, Minato-ku (JP); Mikio Kitaoka, Minato-ku (JP); Hiromitsu Umezawa, Minato-ku (JP); Tsugio Tokumasu, Minato-ku (JP); Toshihiko Watanabe, Minato-ku (JP); Akitoshi Mesaki, Minato-ku (JP); Takashi Kato, Minato-ku (JP); Masaharu Hoshikawa, Minato-ku (JP); Chiharu Nishida, Minato-ku (JP)

(73) Assignee: FDK Corporation, Tokyo (JP)

( * ) Notice: Subject to any disclaimer, the term of this patent is extended or adjusted under 35 U.S.C. 154(b) by 0 days.

(21) Appl. No.: 10/569,097

(22) PCT Filed: Aug. 26, 2004

(86) PCT No.: PCT/JP2004/012279

§ 371 (c)(1),
(2), (4) Date: Feb. 22, 2006

(87) PCT Pub. No.: WO2005/022243

PCT Pub. Date: Mar. 10, 2005

(65) Prior Publication Data

US 2007/0002425 A1    Jan. 4, 2007

(30) Foreign Application Priority Data

Aug. 28, 2003 (JP) ............................. 2003-305011
Feb. 19, 2004 (JP) ............................. 2004-043552

(51) Int. Cl.
*G02F 1/09* (2006.01)
(52) U.S. Cl. ...................................... 359/283; 359/281
(58) Field of Classification Search ......... 359/280–284
See application file for complete search history.

(56) References Cited

U.S. PATENT DOCUMENTS 6,854,125 B2 * 2/2005 Mizuno et al. ............. 720/659

FOREIGN PATENT DOCUMENTS

JP  62-95515  5/1987
JP  9-33871   2/1997

OTHER PUBLICATIONS

Akitoshi Mesaki et al., "Development of Fast Response Faraday Rotator", Proceedings of the IEICE Conference, Mar. 8, 2004, vol. 2004, Electronics 1, p. 280.

Chiharu Nishida et al., "Development of Fast Response VOA", Proceedings of the IEICE Conference, Mar. 8, 2004, vol. 2004, Electronics 1, p. 283.

* cited by examiner

Primary Examiner—Ricky Mack
Assistant Examiner—William C Choi
(74) Attorney, Agent, or Firm—Wenderoth, Lind & Ponack, L.L.P.

(57) ABSTRACT

It is possible to reduce the size of a magneto-optical device, increase the speed of optical control, simplify power supply structure and its control, and maintain a Faraday rotation angle in an arbitrary state even after shut-off of the excitation current. The magneto-optical device includes a magnetic yoke (10) made of a high-permeability magnetic material, the magnetic yoke including a tabular portion (16) and four pillar portions (18) protruding from one side of the tabular portion (16), a coil (12) wound on each of the pillar portions, and a magneto-optical element (14) arranged in an open-magnetic-circuit region surrounded by the end portions of the four pillar portions. A magnetic field obtained by a coil is applied to the magneto-optical element.

19 Claims, 17 Drawing Sheets

FIG. 8
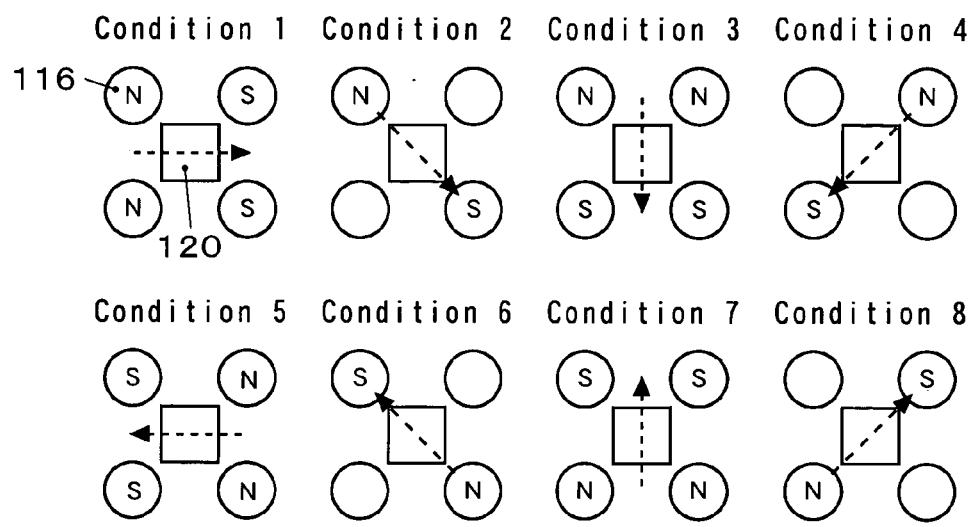
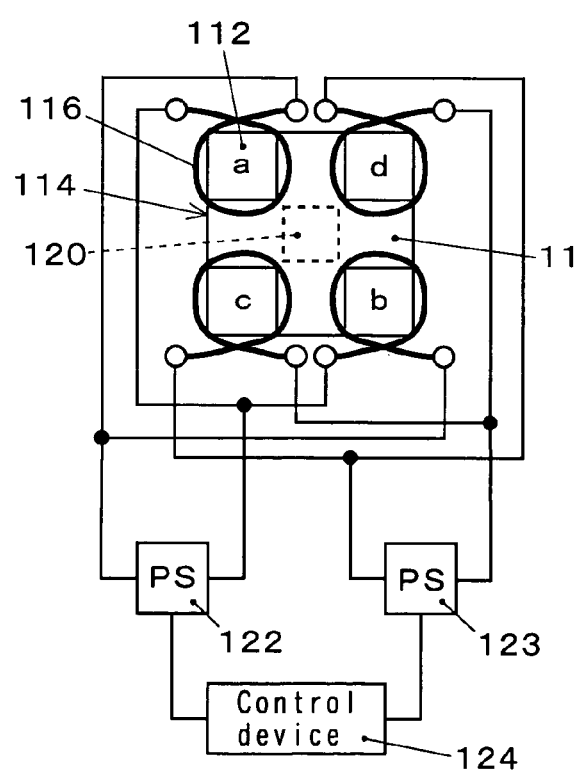
FIG. 9A
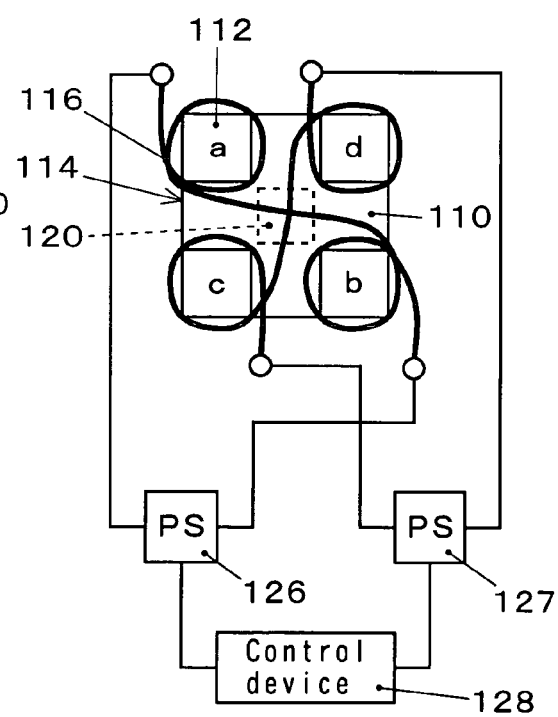
FIG. 9B

Angle between traveling direction of ray and spatial magnetic field [°]

MAGNETO-OPTICAL DEVICE

TECHNICAL FIELD

The present invention relates to a magneto-optical device utilized in a variable optical attenuator, an optical switch, or the like, and particularly to a magneto-optical device in which a magnetic yoke having at least three pillar portions protruding from a tabular portion is utilized, and the magnetization direction of a magneto-optical element is controlled by a magnetic field generated through coils wound around the columnar portions.

BACKGROUND ART

In an optical communication system, an optical measurement system, and the like, a variable optical attenuator is incorporated that is a device for variably controlling the transmitted optical power. The device is comprised of a magneto-optical element having the Faraday effect, a permanent magnet that applies a fixed magnetic field to the magneto-optical element, and an electromagnet that applies a variable magnetic field to the magneto-optical element. Typically, the electromagnet is of a structure in which a coil is wound around a C-shaped (a shape of a circle having an open portion) magnetic yoke. By inserting the magneto-optical element into the open portion of the C-shaped magnetic yoke and applying electric current to the coil, a desired variable magnetic field is applied to the magneto-optical element.

The direction of a constant magnetic field $H_r$ generated by the permanent magnet is made approximately parallel with the optical axis of the magneto-optical element, the magneto-optical element is magnetically saturated, and the maximal Faraday rotation in an actual use is caused. In other words, the Faraday rotation angle $\theta_{f0}$ in the Faraday arrangement of the permanent magnet and the magneto-optical element and the maximal Faraday rotation angle $\theta_{fMax}$ in an actual use are made to be equal ($\theta_{f0}=\theta_{fMax}$). Next, a magnetic field $H_v$ whose direction is approximately perpendicular to the direction of the magnetic field $H_r$ generated by the permanent magnet is generated by the electromagnet, the magneto-optical element is arranged in the combined magnetic field formed of the magnetic field of the permanent magnet and the magnetic field of the electromagnet, and the magnitude of the magnetic field generated by the electromagnet is varied in accordance with the magnitude of the current that flows in the coil of the electromagnet, whereby the direction of the combined magnetic field is controlled. The polarization direction can be controlled in accordance with the magnitude of the optical-axis-direction component of the combined magnetic field. The direction $\theta_c$ of the combined magnetic field $H_c$ is given by the following equation:

$$\theta_c = \tan^{-1}(H_v/H_r)$$

Variation of the variable magnetic field $H_v$ varies the direction $\theta_c$ of the combined magnetic field $H_c$. The Faraday rotation angle $\theta_f$ is in accordance with the optical-axis-direction component of the combined magnetic field $H_c$, and thus given by the following equation; therefore, $\theta_f$ can be controlled by varying $\theta_c$.

$$\theta_f = \theta_{f0} \times \cos\theta_c$$

In other words, by controlling the current that flows in the coil of the electromagnet for generating $H_v$, $\theta_f$ can be controlled.

The Faraday rotation $\theta_{f0}$ is caused through the fixed magnetic field $H_r$ generated by the permanent magnet, and the Faraday rotation $\theta_f$ is obtained in accordance with the direction $\theta_c$ of the combined magnetic field $H_c$ formed of the variable magnetic field $H_v$ generated by the electromagnet and fixed magnetic field $H_r$ generated by the permanent magnet. Because, being a magnetic field generated by a permanent magnet, $H_r$ is constant and not enabled to be zero, large $H_v$ is required to obtain large $\theta_c$. In order to obtain large $H_v$, it is necessary to increase the number of windings of the electromagnet coil or to increase current to be applied to the coil; therefore, the size of the electromagnet is enlarged or the driving voltage is increased. Moreover, there has been a problem in that it takes a long time until the change of the direction $\theta_c$ of the combined magnetic field after the driving voltage has been changed, i.e., operating speed is low.

The case of a variable optical attenuator has a structure in which a first light polarizer, a magneto-optical element, and a second light polarize are arranged in that order, along the optical axis, a saturation magnetic field is applied through a permanent magnet to the magneto-optical element, and a variable magnetic field whose direction is different from that of the saturation magnetic field is applied through an electromagnet to the magneto-optical element. Through the permanent magnet and the electromagnet, external magnetic fields are applied in two or more directions to the magneto-optical element, and the direction of magnetization of the magneto-optical element is changed by changing the vector of the combined magnetic field produced by the permanent magnet and the electromagnet, whereby the Faraday rotation angle of light that passes through the magneto-optical element is controlled. For example, Japanese Patent Laid-Open No. 9-061770 discloses a magneto-optical device, as described above, in which a configuration is employed where block-shaped permanent magnets are arranged above and below the light path, as a means for applying a fixed magnetic field. Additionally, there is a configuration in which permanent magnets of ring-shape or the like are arranged along the optical axis, and a fixed magnetic field is applied in parallel with the optical axis.

As described above, since, in a conventional variable optical attenuator, a permanent magnet is utilized to apply a saturation magnetic field, the magneto-optical element is magnetized in a constant direction by the permanent magnet, even when no electric current is supplied to the electromagnet. Accordingly, the size of a magnetic yoke for an electromagnet utilized for the control of magnetization is rendered large, or the driving voltage is made large; therefore, it is difficult to downsize and speed up the variable optical attenuator.

Moreover, because, when no electric current is applied to the coil of the electromagnet, the variable magnetic field generated by the electromagnet becomes substantially zero, the combined magnetic field to be applied to the magneto-optical element consists only of the component generated by the permanent magnet, whereby the Faraday rotation angle returns to the initial condition.

In contrast, in a Faraday rotator utilized as a self-latching optical switch or the like, the Faraday rotation angle does not returns to the initial condition, even after the exciting current for the coil has been cut off; therefore, the condition in the case where the electric current is applied can be maintained. A Faraday rotator having the self-latching function is comprised of a magneto-optical element having the Faraday effect and a magnetic-field applying device that applies a magnetic field to the magneto-optical element; normally, no permanent magnet is utilized, and the magnetic-field applying device consists only of an electromagnet. As the electromagnet, for example, as disclosed in Japanese Patent Laid-Open No. 8-211347, a structure is utilized in which a coil is wound around a C-shaped magnetic yoke. By inserting the magneto-optical element into the open portion of the C-shaped magnetic yoke and supplying electric current to the coil, a magnetic field is applied to the magneto-optical element. Typically, the control is implemented, with the absolute value of the electric current kept constant, through polarity-reverse action of the electric current, accordingly, the number of possible directions for a magnetic field applied to the magneto-optical element is only two, i.e., the positive and negative directions along a single line; therefore, the number of possible states for the Faraday rotation angle is limited to two states.

In addition, in the Faraday rotator, at least one of the magnetic yoke and the magneto-optical element is formed of a semi-hard magnetic material; both of them are magnetized by exciting current; and after the exciting current is cut off, magnetization remains in the semi-hard magnetic material. In the case where the magneto-optical element is formed of a semi-hard magnetic material, magnetization remains in the magneto-optical element itself; however, in the case where the magnetic yoke is formed of a semi-hard magnetic material, a magnetic field generated by residual magnetization of the magnetic yoke is applied to the magneto-optical element. In both cases, the residual magnetic-field vector and the magnetic-field vector in the case where the electric current is applied are different in magnitude, but the same in direction. Accordingly, even after the exciting current has been cut off, the Faraday rotation angle can be maintained in the same condition as that in the case where the exciting current is flowing; however, maintainable are only two conditions that are possible when the electric current is applied, whereby arbitrary condition cannot be maintained.

As described above, in a conventional variable optical attenuator, by controlling the exciting current supplied to the coil of the electromagnet, the magnetization direction of the magneto-optical element is arbitrarily changed, and, in response to the change of the magnetization direction, the Faraday rotation angle can arbitrarily adjusted; however, the Faraday rotation angle cannot be maintained after the exciting current has been cut off. In contrast, in a conventional Faraday rotator having a self-latching function, even after the exciting current has been cut off, the magnetization direction of the magneto-optical element and the Faraday rotation angle can be maintained; however, the number of maintainable conditions is limited to two.

DISCLOSURE OF THE INVENTION

The first issue to be solved by the present invention is that, in the case of a conventional magneto-optical device in which a permanent magnet and a electromagnet are combined, because a magnetic field generated by the permanent magnet always acts, it is necessary to increase the number of windings of a coil that forms a variable magnetic field or to increase an electric current to be supplied, whereby downsizing is impossible, and it is difficult to speed up the control of light. The second issue to be solved by the present invention is that, even though the permanent magnet is simply replaced by the electromagnet, the complexity of the configuration of the power supply units is raised, and the control is rendered difficult. The third issue to be solved by the present invention is that, in the case of a conventional magneto-optical device in which a permanent magnet and a electromagnet are combined, the Faraday rotation angle cannot be maintained after the exciting current has been cut off, and in the case of a conventional magneto-optical device having a self-latching function, the number of conditions in which the magnetization direction of the magneto-optical element and the Faraday rotation angle can be maintained after the exciting current has been cut off is not arbitrary but limited to two.

[The First Aspect of the Present Invention]

According to the first aspect of the present invention, there is provided a magneto-optical device comprising: a magnetic yoke made of a high-magnetic-permeability material, the magnetic yoke including a tabular portion, and at least three pillar portions protruding perpendicularly from one side of the tabular portion; coils wound around the pillar portions; and a magneto-optical element arranged in an open-magnetic-circuit space surrounded by the respective top-end portions of the pillar portions, wherein magnetic fields generated through the coils are applied to the magneto-optical element.

The simplest magnetic yoke has a structure in which an approximately quadrangular tabular portion and four quadrangular pillar portions protruding from the vicinities of the four corners of the tabular portion, perpendicularly and in the same direction, are continuously integrated. In this case, it is preferable to employ a square tabular portion as well as a square pillar portion.

For the foregoing members, it is preferable that, as the high-magnetic-permeability material, ferrite (e.g., Ni—Zn system ferrite) is utilized, and for the magneto-optical element, a bismuth-substituted rare-earth iron-garnet single crystal is utilized. Besides, by controlling respective directions and/or values of electric currents supplied to the coils, the magnetization direction of the magneto-optical element can be changed.

By arranging light polarizers before and after the foregoing magneto-optical device in the light path thereof and controlling an attenuation value of output optical power versus input optical power, a variable optical attenuator can be configured. Additionally, by arranging light polarizers before and after the magneto-optical device in the light path thereof and controlling switchedly output light versus input light, an optical switch can be configured.

By arranging side by side a plurality of the foregoing magneto-optical devices, various kinds of magneto-optical device arrays can be configured.

The magneto-optical device according to the first aspect of the present invention can be utilized in a variable optical attenuator or an optical switch. When the magneto-optical device is utilized in a variable optical attenuator, fixed magnetic field of a permanent magnet is not necessary, and by generating variable magnetic fields by utilizing electromagnets only, the magnetization direction can instantaneously be changed, whereby downsizing and speedup can be implemented. In addition, since the magnetization direction can arbitrarily be controlled, the range from −45° to +45°, instead of the range from 0° to 90°, can be utilized so that the required 90-degree variable amount in the Faraday rotation angle is obtained; therefore, also in that sense, the downsizing of components to be utilized can be achieved. When the magneto-optical device is utilized in an optical switch, by utilizing a magneto-optical element having a self-latching function, it is not required to utilize a semi-hard magnetic material as a magnetic-yoke material; therefore, the magnetic field generated through the coils and the magnetic yoke may be a critical mass for reversing the magnetization of the magneto-optical element, whereby it is possible to achieve downsizing, speedup, and reduction of power dissipation. Moreover, because the magneto-optical device has a structure in which a leakage magnetic field is weak and magnetic fields converge only on the magneto-optical element, they do not interfere with one another even though a plurality of the magneto-optical devices are arranged side by side; therefore, an array configuration can readily be realized.

[The Second Aspect of the Present Invention]

According to the second aspect of the present invention, there is provided a magneto-optical device comprising: a magnetic yoke made of a high-magnetic-permeability material, the magnetic yoke including 2n (where n≧2) pillar portions protruding perpendicularly from one side of a tabular portion; coils wound around the pillar portions; and a magneto-optical element arranged in an open-magnetic-circuit space surrounded by the respective top-end portions of the pillar portions, wherein: magnetic fields generated through the coils are applied to the magneto-optical element; the polarities of magnetic fields applied to the magneto-optical element, through the coils diagonally opposing each other with respect to the magneto-optical element, are reverse to each other; and a pair of the coils that are diagonally opposing each other with respect to the magneto-optical element and connected in parallel or in series is driven by a common power supply unit. In addition, the power supply unit may be a variable voltage source or a variable current source.

The most simple magnetic yoke has a structure having an approximately square tabular portion and four pillar portions protruding perpendicularly and in the same direction, from the vicinities of the four corners of the tabular portion. In this situation, the tabular portion and the pillar portions maybe in an integrated structure, or a structure may be employed in which each pillar portion is inserted into holes provided in the tabular portion and fixed therein.

A structure may be employed in which a magnetic yoke has a tabular portion and pillar portions protruding in the same direction from the one side of the tabular portion, one pair of the pillar portions opposing each other with respect to the magneto-optical element is arranged perpendicular to the optical axis of the magneto-optical element and the other pair of the pillar portions opposing each other with respect to the magneto-optical element is arranged at a specific angle (smaller than ±90°) from the optical axis. In the case of the foregoing structure, it is preferable that the angle $\theta_h$ between the direction of a first magnetic field formed through the one pair of pillar portions and the direction of a second magnetic field formed through the other pair of pillar portions is set to the angle given by the following equation:

$$\theta_h = \sin^{-1}(\theta_{fMAX}/\theta_{f0})$$

where $\theta_{f0}$ is the Faraday rotation angle of the magneto-optical element in the case where the direction of a saturation combined magnetic field is parallel to the light path, and $\theta_{fMAX}$ is a maximal Faraday rotation angle of the magneto-optical element in the case of actual use.

Further, according to the second aspect of the present invention, there is provided a magneto-optical device in which two magnetic yokes made of a high-magnetic-permeability material and having 2n (where n≧2) pillar portions protruding perpendicularly from one side of a tabular portion are combined in such a way that, with respective coils wound around the pillar portions, the foremost surfaces of the pillar portions of one magnetic yoke butt against the foremost surfaces of the corresponding pillar portions of the other magnetic yoke, a magneto-optical element is arranged in an open-magnetic-circuit space surrounded by the respective top-end portions of the pillar portions, and magnetic fields generated through the coils being applied to the magneto-optical element, wherein: the coils wound around the corresponding pillar portions generate magnetic fields that are reverse to each other; the polarities of magnetic fields applied to the magneto-optical element, through the coils opposing each other with respect to the magneto-optical element, are reverse to each other; the magnetic field generated through the one magnetic yoke and the magnetic field generated through the other magnetic yoke cooperate to act on the magneto-optical element; and a pair of the coils diagonally opposing each other with respect to the magneto-optical element configure a set and are driven by a common power supply unit.

Moreover, according to the second aspect of the present invention, there is provided a magneto-optical device comprising: a magnetic yoke made of a high-magnetic-permeability material, the magnetic yoke including tabular portions opposing and spaced apart from each other and 2n (where n≧2) pillar portions arranged between the tabular portions; a plurality of coils wound around each of the pillar portions; and a magneto-optical element arranged in an open-magnetic-circuit space surrounded by the respective middle portions of the pillar portions, wherein: magnetic fields generated through the coils are applied to the magneto-optical element; the coils wound around the same pillar portion generate magnetic fields that are reverse to each other; the polarities of magnetic fields applied to the magneto-optical element, through the coils opposing each other with respect to the magneto-optical element, are reverse to each other; assuming that the middle portion of the pillar portion regarded as a boundary, the magnetic field generated through the one-side portion of the magnetic yoke and the magnetic field generated through the other-side portion magnetic yoke cooperate to act on the magneto-optical element; and a pair of the coils diagonally opposing each other with respect to the magneto-optical element configure a set and are driven by a common power supply unit.

With the foregoing configuration, it is preferable that, in the case where the direction of a saturation combined magnetic field is parallel to the optical axis of the magneto-optical element, the Faraday rotation angle of the magneto-optical element is set to 127.3° or larger, and the coils are driven by monopolar power supply units.

As is the case with the magneto-optical device according to the first aspect of the present invention described above, the magneto-optical device according to the second aspect of the present invention can be utilized as a Faraday rotator in a variable optical attenuator or an optical switch. Further, by generating magnetic fields by utilizing electromagnets only, without utilizing any fixed magnetic field of a permanent magnet, the magnetization direction can instantaneously be changed, whereby downsizing and speedup can be implemented. Since, regardless of the direction of the combined magnetic field, no large magnetic field is required, the coils can be downsized, whereby the driving voltage can also be reduced.

Since a pair of coils diagonally opposing each other with respect to a magneto-optical element is configured and the coils in the pair are wired in parallel or in series and driven by a common power supply unit, the drive of the coils can efficiently be implemented with a small number of power supply units, whereby the peripheral circuitry can be simplified. In particular, if coils that are connected in parallel are driven, the voltage can be reduced. Moreover, if, in the case where the direction of a saturation combined magnetic field is parallel to the optical axis of the magneto-optical element, the Faraday rotation angle of the magneto-optical element is set to 127.3° or larger, the Faraday rotation angle can be varied over the range from 0° to 90° even though the coils are driven by monopolar power supply units.

By employing the magneto-optical device having a configuration in which two magnetic yokes made of a high-magnetic-permeability material and having 2n (where $n \geq 2$) pillar portions protruding perpendicularly from one side of a tabular portion, are combined in such a way that, the foremost surfaces of the pillar portions of one magnetic yoke butt against the foremost surfaces of the corresponding pillar portions of the other magnetic yoke, or a configuration in which a magnetic yoke made of a high-magnetic-permeability material and having tabular portions that are spaced apart from and opposing each other and 2n pillar portions arranged between the tabular portions is utilized, a larger magnetic field can be applied to the magneto-optical element.

[The Third Aspect of the Present Invention]

According to the third aspect of the present invention, there is provided a magneto-optical device comprising: a magnetic yoke having a tabular portion made of a semi-hard magnetic material and at least three pillar portions, protruding from one side of the tabular portion, that are made of a high-magnetic-permeability material; coils wound around the pillar portions; and a magneto-optical element arranged in an open-magnetic-circuit space surrounded by the respective top-end portions of the pillar portions, wherein magnetic fields generated through the coils are applied to the magneto-optical element.

In the magneto-optical device configured as described above, when respective currents are supplied to the coils, a magnetic field is generated not only in the open-magnetic-circuit space but also in the magnetic yoke, whereby both the tabular portion and the pillar portions that configure the magnetic yoke are magnetized. When exciting currents are cut off, the magnetization in the pillar portions made of a soft-magnetic material tends to transit in a direction along the hysteresis curve so as to lose its own magnetization; in contrast, the tabular portion made of a semi-hard magnetic material exhibit a residual magnetization that magnetizes the pillar portions, whereby a combined magnetic field is formed in the open-magnetic-circuit space. The combined magnetic field is different in magnitude from that in the case where the currents are applied, but the same in direction. Accordingly, by controlling the ratios of the magnetomotive force generated through the coils, thereby controlling the condition of magnetization to be maintained in the tabular portion, the direction of the combined magnetic field that remains in the open-magnetic-circuit space, after the exciting currents are cut off, can be controlled so as to be in an arbitrary direction.

The magnetic yoke may have a structure in which a tabular portion made of a high-magnetic-permeability material and at least three pillar portions, protruding from one side of the tabular portion, that are made of a semi-hard magnetic material, are incorporated. In the case of this configuration, after the exciting currents are cut off, magnetization remains in the pillar portions, and the residual magnetization forms a combined magnetic field in the open-magnetic-circuit space.

By arranging a light polarizer and a light analyzer before and after the foregoing magneto-optical device in the light path thereof and controlling an attenuation value of output optical power versus input optical power, a self-latching variable optical attenuator can be configured. Moreover, by arranging the magneto-optical device, a light polarizer, a light analyzer, and a wavelength plate in a predetermined order and controlling optical separation ratio through the magneto-optical device, a self-latching variable optical splitter can be configured.

Further, according to the third aspect of the present invention, there is provided a magneto-optical device comprising: a magnetic yoke having a block-shaped base portion made of a semi-hard magnetic material and at least four pillar portions, made of a high-magnetic-permeability material, extending from the base portion to the vicinity of a space to be an open-magnetic-circuit space; coils wound around the pillar portions; and a magneto-optical element arranged in the open-magnetic-circuit space surrounded by the respective top-end portions of the pillar portions, wherein magnetic fields generated through the coils are applied to the magneto-optical element, in three or more directions. In the case of this configuration, the direction of the combined magnetic field applied to the magneto-optical element can be controlled so as to be in an arbitrary direction in a 3-dimentional space, and the magnetic direction can be maintained after the exciting currents are cut off.

As is the case with the magneto-optical devices according to the first and second aspects described above, the magneto-optical device according to the third aspect of the present invention can be utilized as a Faraday rotator in a variable optical attenuator, a variable optical splitter, or an optical switch. Further, fixed magnetic field of a permanent magnet is not required, therefore, by generating variable magnetic fields by utilizing electromagnets only, downsizing of the magneto-optical device can be implemented. Because, regardless of the direction of the combined magnetic field, no large magnetic field is required, the coils can be downsized, whereby the driving voltage can also be reduced.

Moreover, by controlling the directions and the values of the respective currents applied to the coils, the direction (the magnetization direction of the magneto-optical element) of the combined magnetic field formed in the open-magnetic-circuit space can be controlled to be in an arbitrary direction, whereby the Faraday rotation angle can arbitrarily be adjusted. Furthermore, by forming with a semi-hard magnetic material the tabular portion or the pillar portion of the magnetic yoke, even after the exciting currents are cut off, the direction of the combined magnetic field that remains in the open-magnetic-circuit space can be controlled so as to be in an arbitrary direction, whereby the Faraday rotation angle can be maintained so as to be in an arbitrary condition.

In the case where the magneto-optical device is utilized as a Faraday rotator in a variable optical attenuator, the value of optical attenuation can be maintained to be in an arbitrary condition even after the exciting currents are cut off. Still moreover, in the case where the magneto-optical device is utilized as a Faraday rotator in a variable optical splitter, the separation ratio for input light can be maintained to be in an arbitrary condition after the exciting currents are cut off.

BRIEF DESCRIPTION OF THE DRAWINGS

FIG. 8 is a set of diagrams illustrating the relationship between a group of magnetic poles and the direction of a magnetic field to be applied;

FIG. 9A is a circuit diagram illustrating wiring of coils and power supply units, in the case where two coils each are connected in parallel;

FIG. 9B is a circuit diagram illustrating wiring of coils and power supply units, in the case where two coils each are connected in series;

| Description of Symbols | |
|---|---|
| 10 | MAGNETIC YOKE |
| 12 | COIL |
| 14 | MAGNETO-OPTICAL ELEMENT |
| 16 | TABULAR PORTION |
| 18 | PILLAR PORTION |
| 110 | TABULAR PORTION |
| 112 | PILLAR PORTION |
| 114 | MAGNETIC YOKE |
| 116 | COIL |
| 120 | MAGNETO-OPTICAL CRYSTAL |
| 122, 123, 126, and 127 | POWER SUPPLY UNIT |
| 124 and 128 | CONTROL DEVICE |
| 210 | MAGNETIC YOKE |
| 211 | TABULAR PORTION |
| 212 | PILLAR PORTION |
| 215 | COIL |
| 220 | MAGNETO-OPTICAL ELEMENT |

MODE FOR CARRYING OUT THE INVENTION

EMBODIMENT 1

Embodiment 1 of a magneto-optical device according to the present invention will be explained with reference to FIGS. 1A to 5. In the case of the most simple configuration of a magneto-optical device in Embodiment 1, a single-piece magnetic yoke made of a high-magnetic-permeability material is utilized in which quadrangular pillar portions are protruding perpendicularly and identically oriented, from the vicinities of the four corners of a square tabular portion, respective coils are wound around the quadrangular pillar portions, and a magneto-optical element is arranged in an open-magnetic-circuit space surrounded by the top-end portions of the four quadrangular pillar portions. Besides, variable magnetic fields through the coils are applied to the magneto-optical element.

Figure 1A:
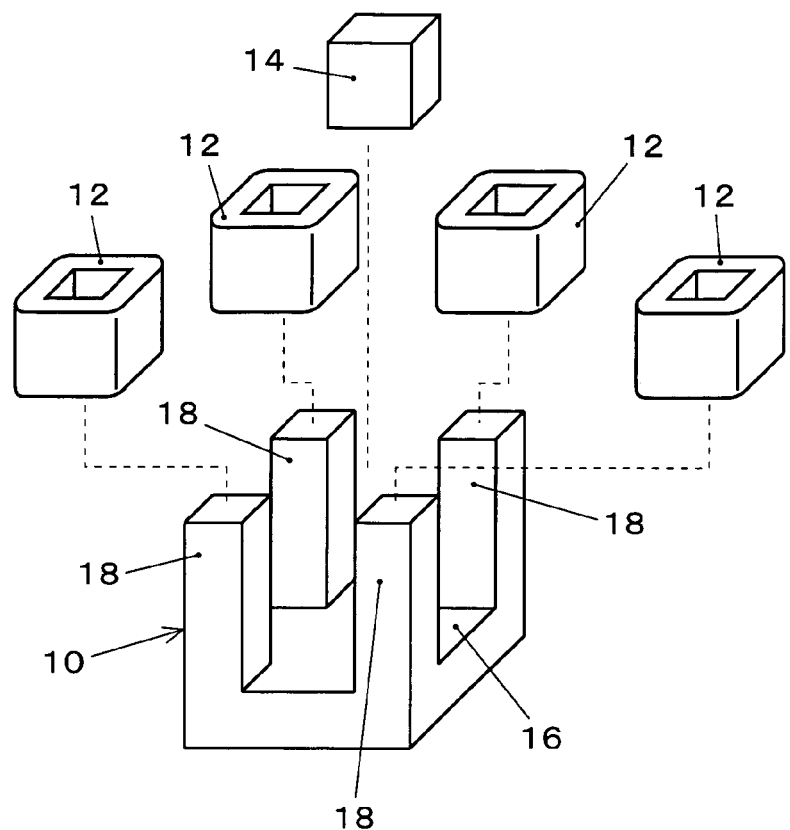
FIG. 1A is an exploded perspective view illustrating Embodiment 1 of a magneto-optical device according to the present invention.
Figure 1B:
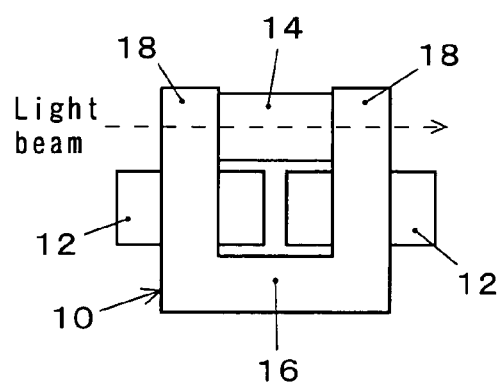
FIG. 1B is a side view of the magneto-optical device in FIG. 1A.
Figure 1C:
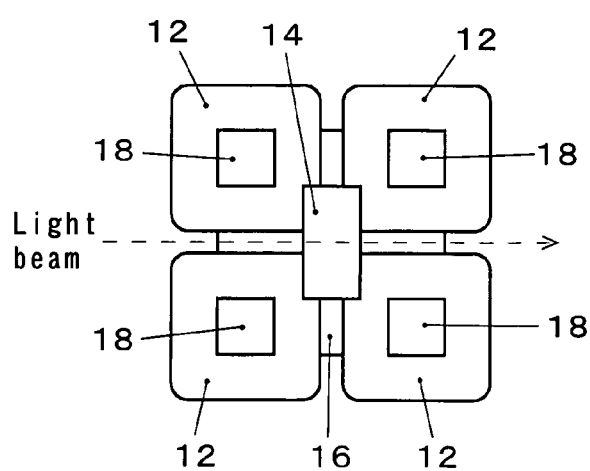
FIG. 1C is a plan view of the magneto-optical device in FIG. 1A.

FIGS. 1A to 1C illustrate an example of a magneto-optical device according to the present invention. FIG. 1A is an exploded perspective view; FIGS. 1B and 1C are a side view and a plan view, respectively. The magneto-optical device includes a magnetic yoke 10, coils 12 wound around the magnetic yoke 10, and a magneto-optical element 14. The magnetic yoke 10 has a structure in which a square tabular portion 16 and four square pillar portions 18 that are equal in length and protruding perpendicularly and identically oriented, at the four corners of the square tabular portion 16, are continuously integrated, and made of a high-magnetic-permeability material. The coils 12 are wound around the respective pillar portions 18. The magneto-optical element 14 is arranged in an open-magnetic-circuit space surrounded by the top-end portions of the four pillar portions 18. Accordingly, a magnetic field generated by the coils 12 is applied to the magneto-optical element 14.

As the high-magnetic-permeability material, for example, Ni—Zn system ferrite is utilized. The magnetic yoke 10 has a structure formed by integrally molding the high-magnetic-permeability material in a predetermined form and sintering the molded material. The performance of the magnetic yoke 10 is enhanced by utilizing ferrite single crystal. In this case, the magnetic yoke 10 is produced by cutting out a portion of ferrite in a predetermined shape from a block ferrite. As the magneto-optical element, for example, a bismuth-substituted rare-earth iron-garnet single crystal is utilized. The single crystal can be grown through the LPE (liquid-phase epitaxy) method. Additionally, a YIG (yttrium iron garnet) single crystal may be utilized.

In the case of the magneto-optical device, by controlling the directions and/or values of electric currents supplied to four coils, the magnetization direction of the magneto-optical element can be changed.

Figure 2:
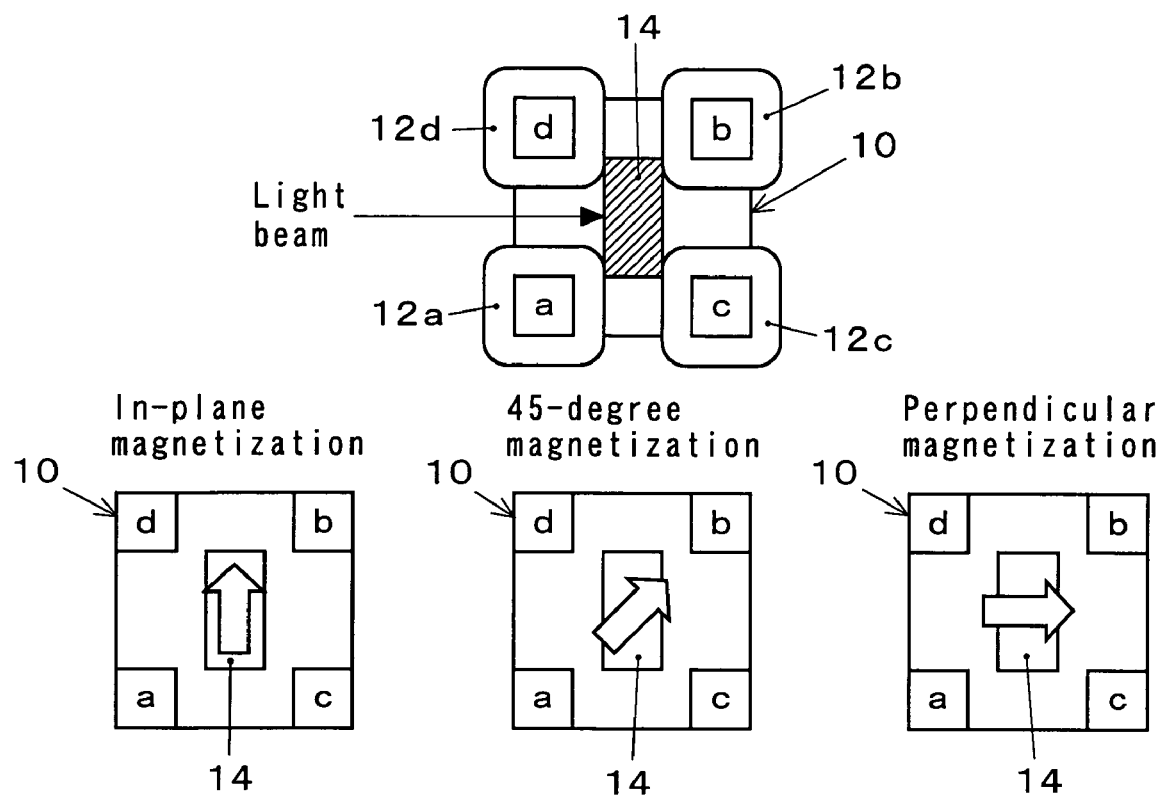
FIG. 2 is a view for explaining the operation of the magneto-optical device in FIG. 1A.

FIG. 2 is a set of plan views for explaining the operation of a magneto-optical device according to the present invention. The respective top ends of the pillar portions of the magnetic yoke are indicated by reference characters a, b, c, and d; the respective coils that correspond to the top ends and are wound around the pillar portions are indicated by similar reference characters (coils 12a to 12d). In this situation, it assumed that, as indicated by an arrow, light passes through the magneto-optical element, from the left-hand side of FIG. 2 to the right-hand side. The coils 12a and 12b are wound in series. Besides, a and b have opposite magnetic polarities. The coils 12c and 12d are also wound in series. Further, c and d have opposite magnetic polarities. Magnetization directions are indicated by white arrows.

(In-Plane Magnetization)

Single-direction currents flow through the coils 12a and 12b and through the coils 12c and 12d. Accordingly, a and b are magnetized to N and S poles, respectively; similarly, c and d are magnetized to N and S poles, respectively. In consequence, a magnetic field perpendicular to the optical axis is applied to the magneto-optical element 14, i.e., in-plane magnetization (magnetization whose direction is parallel to the incident/exit plane of the magneto-optical element) is generated.

(45-Degree Magnetization)

A single-direction current flows through the coils 12a and 12b only. No current is applied to 12c and 12d. Accordingly, a and b are magnetized to N and S poles, respectively; inconsequence, a magnetic field whose direction has a gradient of 45° with respect to the optical axis is applied to the magneto-optical element 14, i.e., 45-degree magnetization (magnetization whose direction has a gradient of 45° with respect to the incident/exit plane of the magneto-optical element) is generated.

(Perpendicular Magnetization)

A single-direction current flows through the coils 12a and 12b, and a single-direction current whose direction is reverse to that in the case of the in-plane magnetization flows through the coils 12c and 12d. Accordingly, a and b are magnetized to N and S poles, respectively; c and d are magnetized to S and N poles, respectively. In consequence, a magnetic field whose direction is parallel to the optical axis is applied to the magneto-optical element 14, i.e., perpendicular magnetization (magnetization whose direction is perpendicular to the incident/exit plane of the magneto-optical element) is generated.

At any rate, an electric current whose direction is always the same flows through the coils 12a and 12b, whereby the top ends a and b are magnetized always in the same polarity (e.g., a is magnetized always to N, and b, to S pole). From the state of in-plane magnetization to the state of the 45-degree magnetization, a single-direction current flows also through the coils 12c and 12d; by reducing the value of the current, arbitrary magnetization directions can be realized. From the state of 45-degree magnetization to the state of the perpendicular magnetization, a reverse-direction current flows through the coils 12c and 12d; by increasing the value of the current, arbitrary magnetization directions can be realized. As described above, by controlling the values and directions of the currents applied to the coils, the direction of the magnetic field can be controlled.

Figure 3:
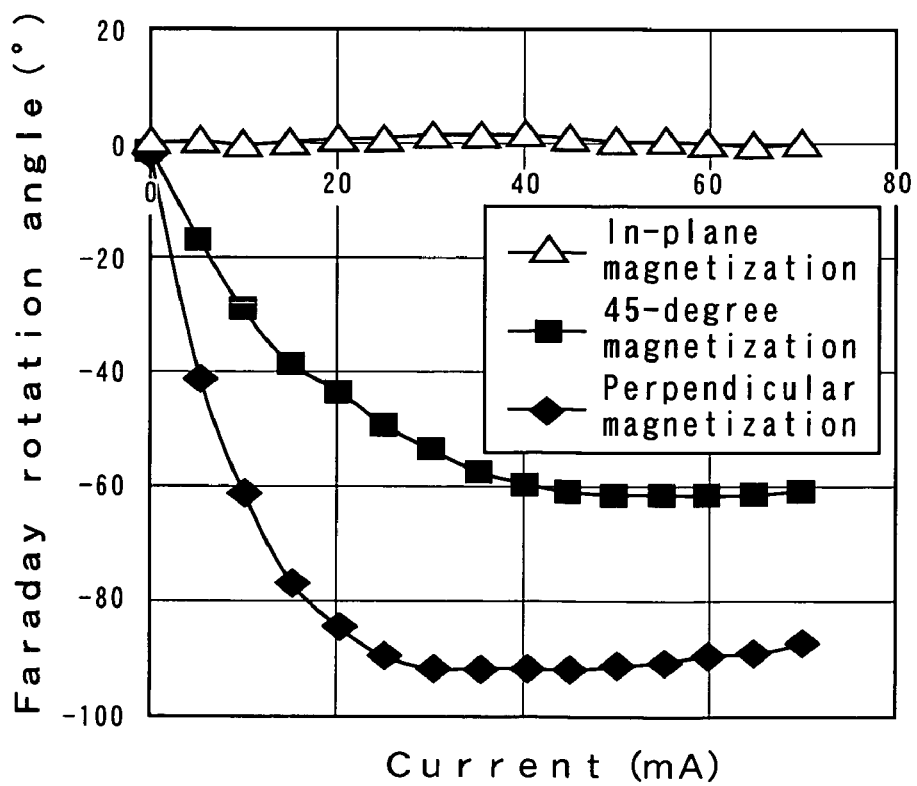
FIG. 3 is a graph representing a relationship between the Faraday rotation angle and the current, with the magnetization direction utilized as a parameter.

FIG. 3 is a graph representing an example of measurement results with regard to the relationship between the Faraday rotation angle and the coil-current value, with the magnetization direction utilized as a parameter. Although depending on the structure and the material of the magnetic yoke, it can be seen that, when the value of the coil current is larger than a specific value, the Faraday rotation angle is saturated to a constant value.

Figure 4:
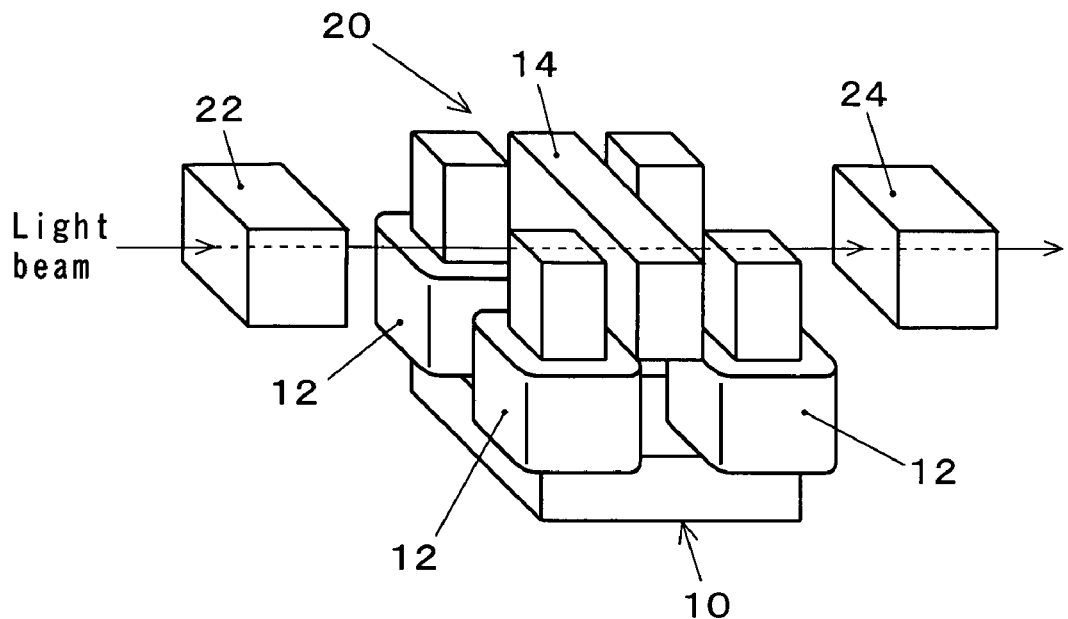
FIG. 4 is a view illustrating a configuration of a variable optical attenuator or an optical switch.

FIG. 4 is an explanatory view illustrating an example of a variable optical attenuator according to the present invention. A configuration is employed in which, before and after the magneto-optical device 20, a first light polarizer 22 and a second light polarizer 24 are arranged along the light path. The magneto-optical device 20 may be identical to that illustrated in FIGS. 1A to 1C; for simplicity, corresponding members are designated by the same reference characters.

In this situation, the magneto-optical element 14 is made thick enough to cause a Faraday rotation angle of 45° or larger. In addition, the first light polarizer 22 and the second light polarizer 24 are linear polarizers, such as an absorption-type polarizer, polarization glass (brand names "Polarcor", "CUPO", and the like), or a multilayer-type polarizer, and arranged in such a way that their optical axes are within planes that are parallel to each other and have a predetermined angle difference (e.g., a predetermined angle difference of 45° or larger between the optical axes, when viewed with respect to the light path) between them.

By controlling through the magneto-optical device 20 the Faraday rotation angle of the magneto-optical element 14 over the range from −45° to +45°, the amount of light output from the second light polarizer 24 versus the amount of input light to the first light polarizer 22 is variably controlled.

Because, without utilizing any fixed magnetic field generated by a permanent magnet, the magnetic field for a variable optical attenuator configured as described above is made up merely of variable magnetic fields generated by electromagnets, the magnetization direction can instantaneously be changed, whereby the operation of the variable optical attenuator is speeded up. In addition, because the magnetization direction can arbitrarily be controlled, the range from −45° to +45° can be utilized so that the 90-degree variable amount in the Faraday rotation angle, which is required of an optical attenuator, is obtained; therefore, in comparison to a conventional configuration, the magneto-optical element is required to have merely half of the rotation angle (i.e., a thickness corresponding to 45-degree rotation angle).

Figure 5:
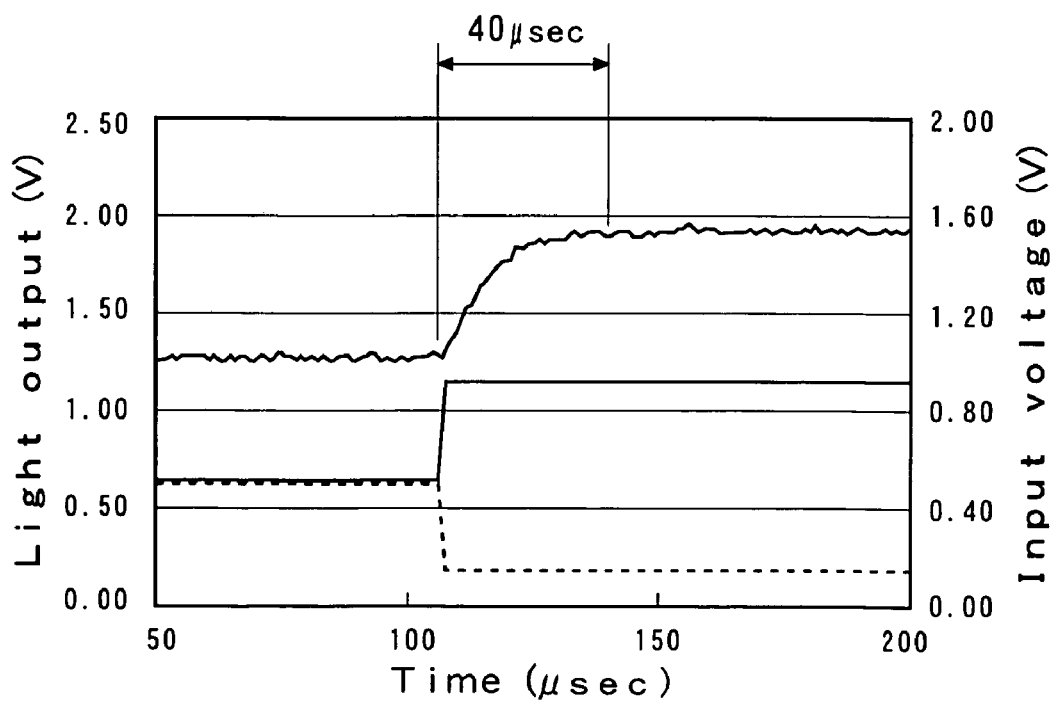
FIG. 5 is an explanatory graph representing an example of the response performance of a magneto-optical device.

The conditions obtained are listed below under which, by utilizing a magnetic yoke that is made of Ni—Zn ferrite having a magnetic permeability of 2000 and 2.8 mm by 2.8 mm by 4.5 mm (length by width by height) in size, a magnetic-field strength of 12000 A/m (150 Oe), which is required to magnetically saturate the magneto-optical element or reverse the magnetization direction, is obtained:
Number of windings: 130
Coil resistance (diameter of conductor φ=50 μm): 5.17Ω
Magnetomotive force: 11.9 AT
Current value: 96 mA
Power consumption: 48 mW
Time constant: 50.1 μsec FIG. 5 is a graph representing an example of measurement result on the response speed of the magnetic circuit. The duration between the instant when the input voltages to be applied to both sets of coils were concurrently switched and the instant when the light output became stable was measured. It can be seen in FIG. 5 that the response speed was approximately 40 μsec. For reference's sake, with a conventional optical attenuator, the response speed was approximately 200 μsec. The optical attenuator according to the present invention does not require a permanent magnet; therefore, the response speed is raised.

As is the case with FIG. 4, an optical switch is configured in such a way that, before and after a magneto-optical device, respective light polarizers are arranged along the light path of the magneto-optical device. In the case of an optical switch, it is desirable to utilize a magneto-optical element having a self-latching function. That is because, thanks to the self-latching function, the optical switch can maintain the state even though the coil current is cut off. As a magneto-optical element having a self-latching function, for example, a bismuth-substituted rare-earth iron garnet single crystal having residual magnetization can be utilized; by, without applying heat treatment, directly utilizing a film grown through the LPE method, the self-latching function is demonstrated. By switching Faraday rotation angles through the magneto-optical device, output light versus input light can be switchably controlled. Accordingly, it is not necessary that, as a conventional magneto-optical device, the magnetic-yoke material is limited to a semi-hard magnetic material. Therefore, the magnetic field generated through the coils and the magnetic yoke may be a critical mass for reversing the magnetization of the magneto-optical element; as a result, it is possible to downsize the device and to reduce the power dissipation.

Moreover, the magneto-optical device according to the present invention has a structure in which no permanent magnet is utilized, the leakage magnetic field is small, and the magnetic fields converge on the magneto-optical element only; therefore, even though a plurality of magneto-optical devices are provided in parallel, no magnetic interference occurs, whereby an array structure is readily enabled. Variable optical attenuators, optical switch arrays, and the like can be realized, by utilizing the magneto-optical device.

In addition, although, in Embodiment 1, a configuration is employed in which four pillar portions are provided on the tabular portion, the present invention is not limited to the configuration; e.g., a configuration may also be employed in which three, or five or more pillar portions are provided. If at least three pillar portions are provided on the tabular portion, by controlling respective directions and values of the currents supplied to the coils wound around the pillar portions, the combined magnetic field can arbitrarily be oriented, as is the case with four pillar portions. Moreover, the shape of the tabular portion is not limited to a square; e.g., other polygons, a circle, or the like may be employed.

EMBODIMENT 2

Figure 6A:
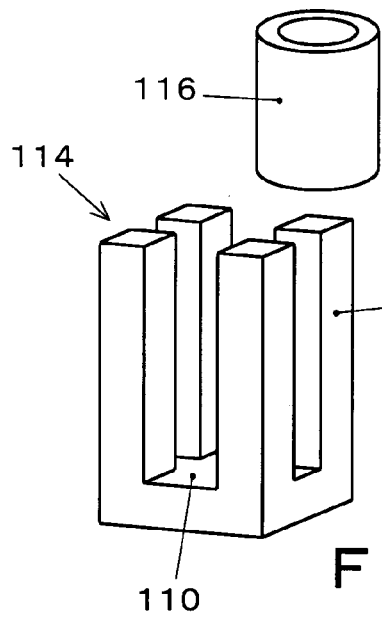
FIG. 6A is an explanatory view illustrating Embodiment 2 of a magneto-optical device according to the present invention.
Figure 6B:
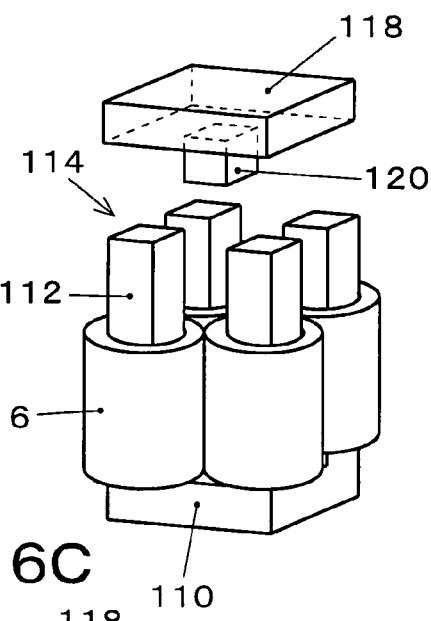
FIG. 6B is an explanatory view illustrating a condition in which air-core coils are mounted on the magnetic yoke in FIG. 6A.
Figure 6C:
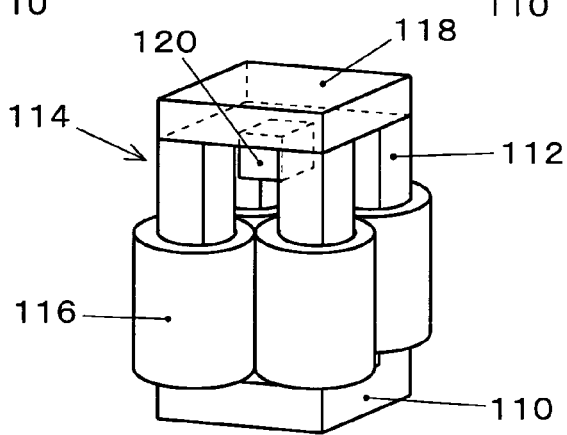
FIG. 6C is an explanatory view illustrating a condition in which a magneto-optical element is arranged in the open-magnetic-circuit space in FIG. 6B.

Embodiment 2 of a magneto-optical device according to the present invention will be explained with reference to FIGS. 6A to 19B. In the case of the most simple configuration of a magneto-optical device in Embodiment 2, as illustrated in FIGS. 6A to 6C, a single-piece magnetic yoke 114 made of a high-magnetic-permeability material is utilized in which quadrangular pillar portions 112 are protruding perpendicularly and in the same direction, from the vicinities of the four corners of a square tabular portion 110 (refer to FIG. 6A). Respective coils 116 are wound around the quadrangular pillar portions 112 (refer to FIG. 6B); a magneto-optical element 120 mounted on a non-magnetic holding member 118 is arranged in an open-magnetic-circuit space surrounded by the top ends of the four quadrangular pillar portions 112 (refer to FIG. 6C). Besides, the magneto-optical device is configured in such a way that variable magnetic fields generated through the coils 116 are applied to the magneto-optical element 120.

Figure 7A:
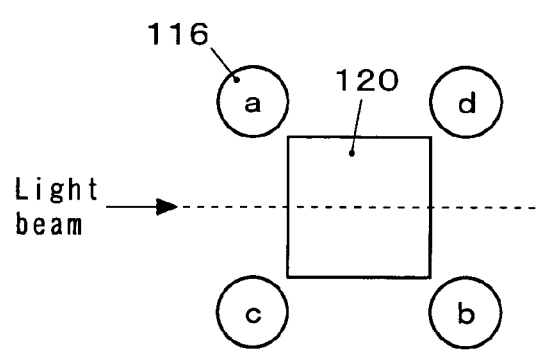
FIG. 7A is a diagram for explaining arrangement of coils.
Figure 7B:
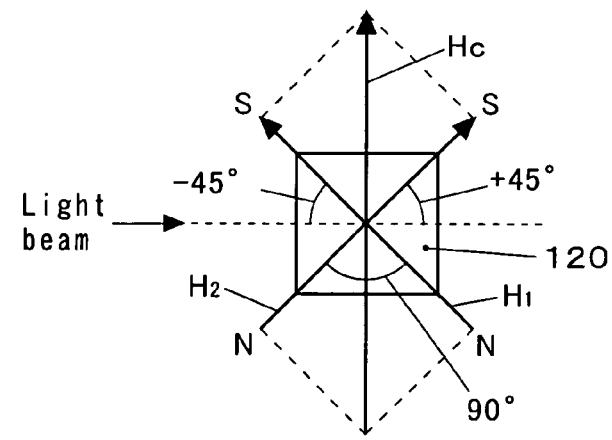
FIG. 7B is a chart for explaining magnetic fields to be applied.

As illustrated in FIG. 7A, the respective coils are designated by Reference characters a to d. In accordance with magnetic poles that, through electric currents being applied to the coils, appear at the respective top ends of the pillar portions, the direction of a combined magnetic field to be applied to the magneto-optical element 120 can be changed. As illustrated in FIG. 7B, in the case where, through the coils a and b, magnetic poles S and N are respectively generated, a magnetic field $H_1$ occurs oriented at −45° from the optical axis that passes through the magneto-optical element 120; in contrast, in the case where, through the coils c and d, magnetic poles N and S are respectively generated, a magnetic field $H_2$ occurs oriented at +45° from the optical axis that passes through the magneto-optical element 120. In the case where both $H_1$ and $H_2$ are applied, a combined magnetic field HC generated through $H_1$ and $H_2$ is applied to the magneto-optical element 120. Accordingly, by controlling the values or the directions of the electric currents applied to the respective coils, the combined magnetic field HC can be applied in any direction.

By controlling the values or the directions of the electric currents applied to the respective coils, it is possible to make the direction of the combined magnetic field turn 360 degrees. FIG. 8 illustrates the typical directions of the combined magnetic field. In FIG. 8, conditions in the case where the combined magnetic field is changed by 45° successively are represented in states 1 to 8. It can be seen from FIG. 8 that, when magnetic fields are generated by applying electric currents to the coils, two poles, at the top ends of the pillar portions, that are generated through the coils (a and b, or c and d) opposing each other with respect to the magneto-optical element 120 have respective polarities that are reverse to each other. Paying attention to the fact, it can be seen that the two coils can be connected to a monopolar power supply unit in such a way as to generate respective polarities that are reverse to each other. Accordingly, even through there are four coils, two coils can be driven as a pair by a common power supply unit; therefore, only two power supply units are required, and a relatively simple control system may be utilized.

FIGS. 9A and 9B illustrate examples of coil-connection methods. FIG. 9A illustrate an example in which the coils a and b are connected in parallel and connected to a first common power supply unit 122, the coils c and d are connected in parallel and connected to a second common power supply unit 123, and control is implemented by a control device 124. FIG. 9B illustrate an example in which the coils a and b are connected in series and connected to a first common power supply unit 126, the coils c and d are connected in series and connected to a second common power supply unit 127, and control is implemented by a control device 128. In this situation, reference characters a to d correspond to those in FIG. 7A. Each power supply unit may be a variable voltage source or a variable current source. By controlling the coil currents by means of the control devices 124 and 128 such as a CPU, the magnitude and the direction of the combined magnetic field can be controlled. The combined magnetic field may have constant magnitude to such an extent as can magnetically saturate the magneto-optical element, regardless of the magnetization direction. In the present invention, because there is no fixed magnetic field generated by a permanent magnet, it is not necessary to excessively magnify the combined magnetic field, whereby the number of coil windings can be reduced, and the magneto-optical device can be downsized.

When a plurality of coils that are in parallel with one another is connected to a power supply unit, the total resistance value is reduced. For example, if two coils having resistance R are connected in parallel, the total resistance $R_p$ is R/2; if two coils having resistance R are connected in series, the total resistance $R_s$ is 2R; therefore, if the total resistances are compared with each other, $R_p$ is a quarter of $R_s$. In the case of parallel connection, the current I that flows in each coil is V/R. In the case of series connection, the current I that flows in each coil is V/2R; should the same current I is required in both the series connection and the parallel connection, the voltage to be applied in the case of the parallel connection is half of that in the case of the series connection, whereby low-voltage drive is enabled. Because coils that configure the pair are the same in the number of windings and approximately the same in the length of the wire, their resistances are approximately the same; therefore, in the case of the parallel connection, approximately the same current can flows through each coil.

Magneto-optical devices illustrated in FIGS. 6A to 6C can be produced, for example, in the following way. By cutting notches, from two directions that are perpendicular to each other, in a rectangular-parallelepiped block made of a high-magnetic-permeability material such as NiCuZn-system, a magnetic yoke 114 having four integrated pillar portions 112 can be created (refer to FIG. 6A). It goes without saying that the magnetic yoke 114 may be formed through press molding and baked to a desirable shape. Respective air-core coils 116 that have preliminarily been produced are mounted and fixed, through an adhesive or the like, on the four pillar portions 112 (refer to FIG. 6B). In this case, if the air-core coil 116 is made of an enamel-coated wire material, the air-core coil 116 may be fixed on the pillar portion 112 by coating an organic solvent such as ethyl alcohol on the air-core coil 116 to dissolve the enamel after mounting the air-core coil 116 on the pillar portion 112. Because, in the foregoing configuration, the magnetic yoke 114 has a unified structure, magnetic resistance thereof can be suppressed to a minimum, whereby a high-efficiency magnetic circuit can be obtained. Next, the stage 118, made of a non-magnetic material, to which the magneto-optical element 120 is adhesively fixed, is fixed through an adhesive or the like on the top ends of the pillar portions 112 (refer to FIG. 6C). As the magneto-optical element 120, for example, a bismuth-substituted rare-earth iron-garnet single crystal is utilized. The single crystal can be grown through the LPE (liquid-phase epitaxy) method. Additionally, a YIG (yttrium iron garnet) single crystal may be utilized.

Besides, two pairs of the coils that are arranged diagonally opposing each other, with respect to the magneto-optical element, are connected in parallel (refer to FIG. 9A) or in series (refer to FIG. 9B) to the power supply unit. In this situation, the polarities of magnetic fields to be applied to the magneto-optical element are made reverse to each other. Compared with a method in which, with four coils connected to respective power supply units, the four power supply units are controlled to adjust the magnitude and direction of the combined magnetic field, the control is far facilitated, and costs are reduced.

As illustrated in FIG. 7B, the magnetic field generated through a first circuit is designated by $H_1$; the magnetic field generated through a second circuit is designated by $H_2$. $H_1$ is oriented at −45° from the incident optical axis, and $H_2$, +45°. The foregoing magnetic-field directions are angles obtained through magnetic yokes, as illustrated in FIGS. 6A to 6C, whose structures are inexpensive and readily producible. In this case, the direction $\theta_c$ of the combined magnetic field is given by the following equation:

$$\theta_c = 45 - \tan^{-1}(H_1/H_2)$$

Because the magnitudes of the magnetic fields generated through the respective circuits are proportional to the values of the currents, $H_1$ and $H_2$ in the above equation can be replaced by a current $I_1$ that flows in the first circuit and a current $I_2$ that flows in the second circuit, respectively. Because the following equation is given, it can be seen that, by controlling the currents $I_1$ and $I_2$, a desired Faraday rotation angle can be obtained.

$$\theta_f = \theta_{f0} \times \cos \theta_c$$

Figure 10A:
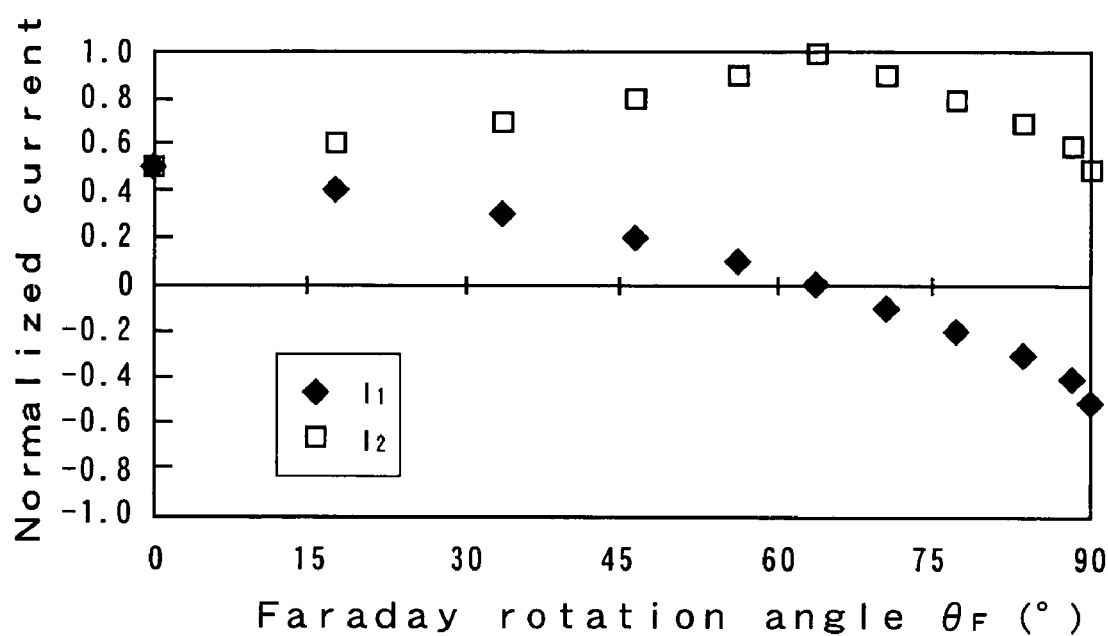
FIG. 10A is a graph representing a relationship between the Faraday rotation angle and the current, in the case where a magneto-optical element having $\theta_{f0}$ of 90° is utilized.

In the case where a magneto-optical is utilized within the range, of the Faraday rotation angle $\theta_f$, from 0° to $\theta_{fMAX}$, mostly utilized is a magneto-optical element whose Faraday rotation angle $\theta_{f0}$ in the case where the direction of the saturation combined magnetic field is in parallel with the optical axis is equal to $\theta_{fMAX}$. FIG. 10A is a graph representing a relationship between $\theta_f$ and the current $I_1$ or $I_2$, in the case where a magneto-optical element having $\theta_{f0}$ of 90° is utilized. In this case, when the direction $\theta_c$ of the combined magnetic field is requested to be smaller than 45°, it is necessary to reverse the polarity of $H_1$. In other words, it is necessary to make the current flow reversely. It can be seen from FIG. 10A that the polarity of $I_1$ reverses at the $\theta_f$ of approximately 64°. The fact is because the maximal Faraday rotation angle $\theta_{fMAX}$ in the case of the actual use is equal to $\theta_{f0}$. The above configuration enables $\theta_f$ to be varied from 0° to 90°; however, it requires bipolar power supply units, thereby raising the costs. Additionally, there is an inflection point in the current $I_2$, whereby control of the currents is rendered slightly complicated.

The problem can be solved, by making the Faraday rotation angle $\theta_{f0}$ of the magneto-optical element in the case where the direction of the saturation combined magnetic field is in parallel with the optical axis be larger than $\theta_{fMAX}$ so that $\theta_f$ becomes equal to $\theta_{fMAX}$ or larger when the magnetic field to be applied consists of $H_2$ only. For example, in the case where, as the foregoing example, $H_2$ is oriented at 45° from the incident optical axis, the magnetic field to be applied consists of $H_2$ only, and $\theta_{f0}$ is 90°, $\theta_f$ is given by the following equation:

$$\theta_f = 90 \times \cos 45 = 63.6°$$

Accordingly, $\theta_f$ is small by 26.4° in comparison to the required $\theta_{fMAX}$, 90°.

In this case, if a magneto-optical element having a large $\theta_{f0}$, e.g., 127.3°, is utilized, $\theta_f$ is given by the following equation; therefore, without applying a magnetic field reverse to $H_1$, $\theta_{fMAX}$ can be satisfied.

$$\theta_f = 127.3 \times \cos 45 = 90°$$

In other words, if the following equation is yielded, the foregoing problem can be solved.

$$\theta_{fMAX} = \theta_{f0} \times \cos \theta_c$$

Figure 10B:
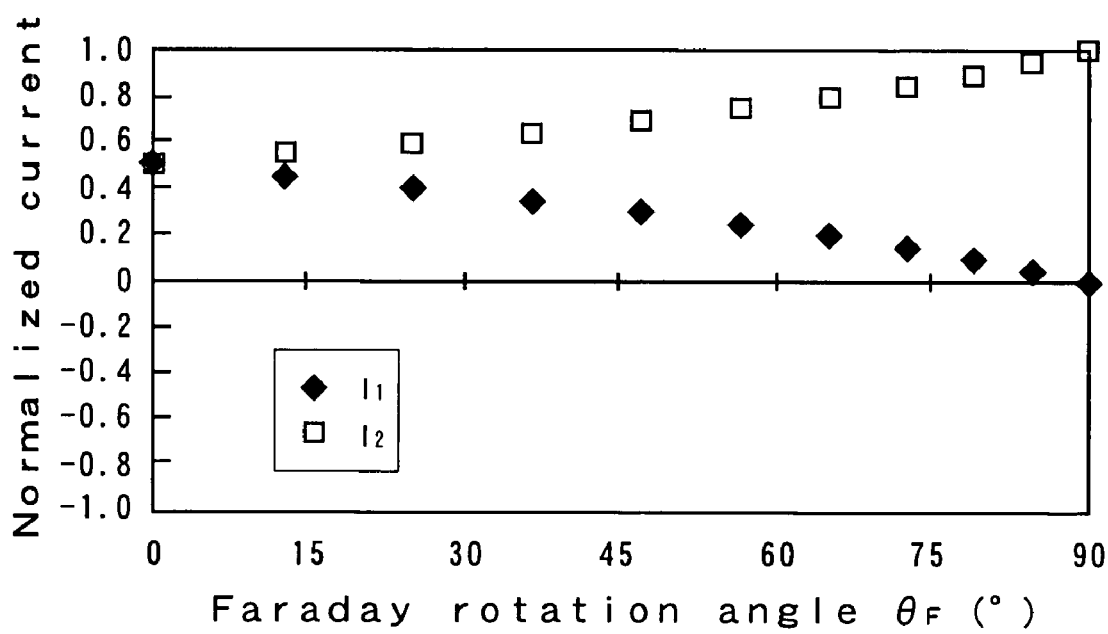
FIG. 10B is a graph representing a relationship between the Faraday rotation angle and the current, in the case where a magneto-optical element having $\theta_{f0}$ of 127.3° is utilized.

FIG. 10B is a graph representing a relationship between the Faraday rotation angle $\theta_f$ and the current $I_1$ or $I_2$, in the case where a magneto-optical element is utilized that has the Faraday rotation angle $\theta_{f0}$ of 127.3° when the direction of the saturation combined magnetic field is in parallel with the optical axis. From FIG. 10B, it can be seen that there is no reversal of polarity in the current $I_1$ and no inflection point in the current $I_2$. Accordingly, the foregoing configuration makes it possible to utilize monopolar power supply units and facilitates the control of the currents.

Figure 11A:
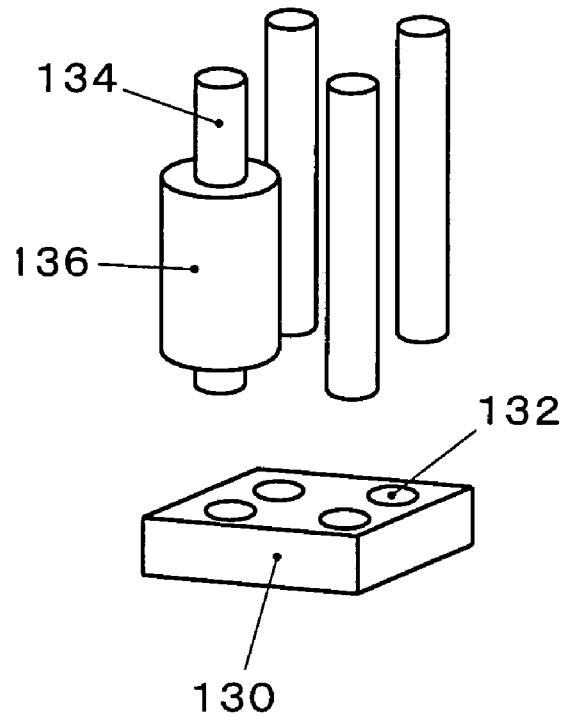
FIG. 11A is an explanatory view illustrating an example of another structure of a magnetic yoke.
Figure 11B:
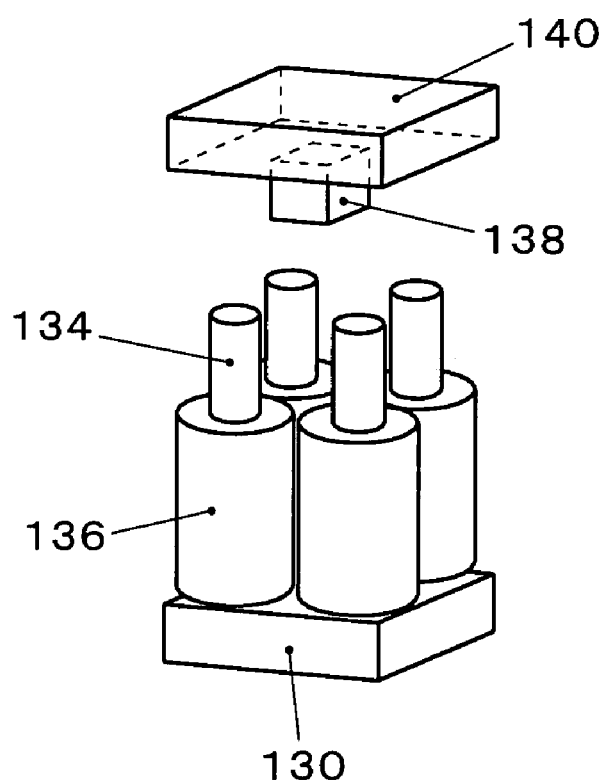
FIG. 11B is an explanatory view illustrating a condition in which air-core coils are mounted on the magnetic yoke in FIG. 11A.
Figure 11C:
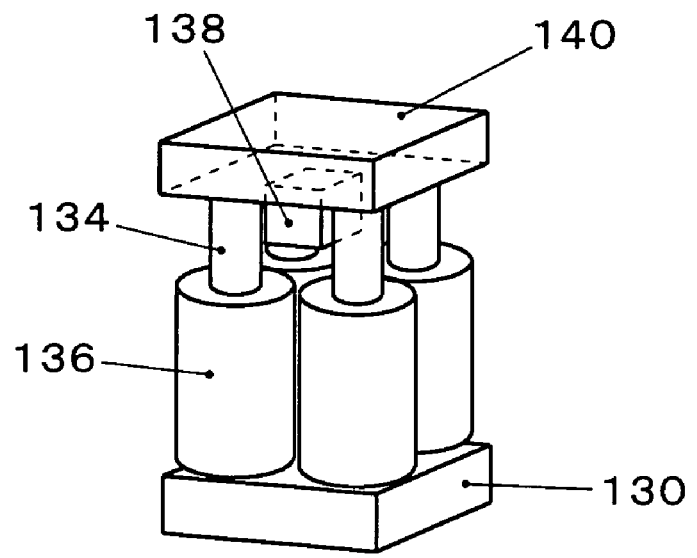
FIG. 11C is an explanatory view illustrating a condition in which a magneto-optical element is arranged in the open-magnetic-circuit space in FIG. 11B.

FIGS. 11A to 11C are views illustrating another example of the magnetic yoke. The magnetic yoke is configured in such a way that through-holes 132 are provided at the four corners of a square tabular portion 130 made of ferrite or the like, cylindrical members 134 made of ferrite or the like are inserted into the through-holes 132 (refer to FIG. 11A) and fixed thereto through an adhesive or the like (refer to FIG. 11B) As described above, it is possible to produce relatively readily a magnetic yoke that is substantially unified. A magneto-optical element 138 is fixed in such a way as to be situated in the center of the top ends of the four cylindrical members 134. For that purpose, for example, respective holes (unillustrated) are provided at the four corners of a square-tabular non-magnetic stage 140 so that the cylindrical members are automatically positioned at and fixed to the respective holes, and with the holes as reference points, a hole is provided at which the magneto-optical element 138 is positioned and fixed; in this way, the magneto-optical element 138 can readily be fixed in the center of the top ends of the four cylindrical members 134 (refer to FIG. 11C).

Figure 12:
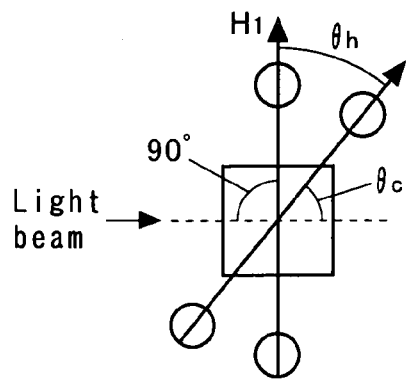
FIG. 12 is a chart representing another example of arrangement of coils and magnetic fields to be applied.
Figure 13:
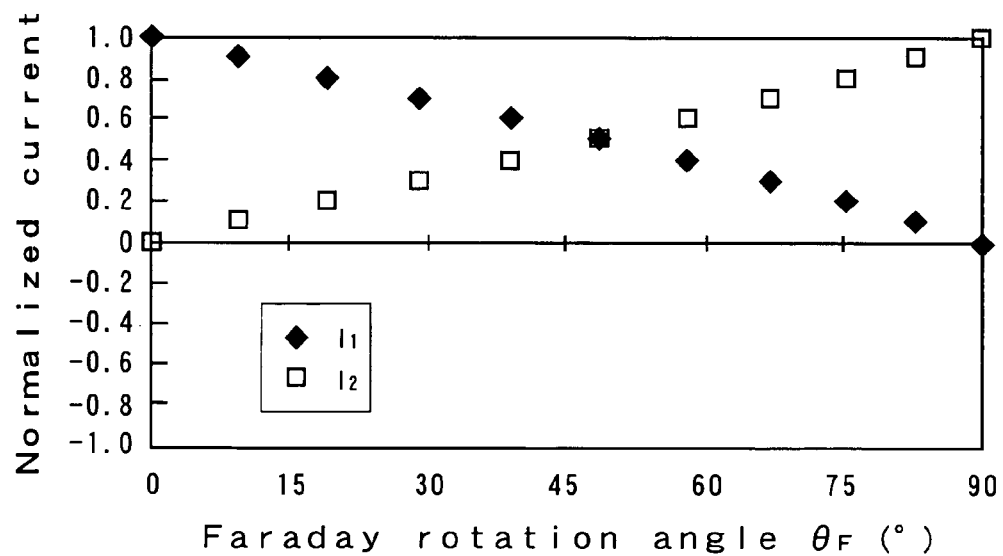
FIG. 13 is a graph representing another example of the relationship between the Faraday rotation angle and the current.

As illustrated in FIG. 12, in order to further simplify the control of the currents, the first magnetic field $H_1$ is made to be in a direction, perpendicular to the incident optical axis, in which the Faraday rotation is 0°, and the second magnetic field $H_2$ is set to be tilted by $\theta_c$ from the incident optical axis. Accordingly, if $\theta_f$ is requested to be zero, only $I_1$ is supplied; and if $\theta_f$ is requested to be $\theta_{fMAX}$, only $I_2$ is supplied. FIG. 13 is a graph representing a relationship between the Faraday rotation angle $\theta_f$ and the current $I_1$ or $I_2$, in the case where a magneto-optical element is utilized that has the Faraday rotation angle $\theta_{f0}$ of 127.3° when the direction of the saturation combined magnetic field is in parallel with the optical axis. The angle $\theta_c$ is 45°. It can be seen that both $I_1$ and $I_2$ can linearly be varied for $\theta_f$. Because, in this case, $\theta_h = 90 - \theta_c$, $\theta_f = \theta_{fMAX}$, and $\theta_c = \cos^{-1}(\theta_{fMAX}/\theta_{f0})$, $\theta_h$ can be rendered by the following equation:

$$\theta_h = 90 - \cos^{-1}(\theta_{fMAX}/\theta_{f0}) = \sin^{-1}(\theta_{fMAX}/\theta_{f0})$$

In other words, if the above equation is satisfied, the control can be simplified.

Figure 14:
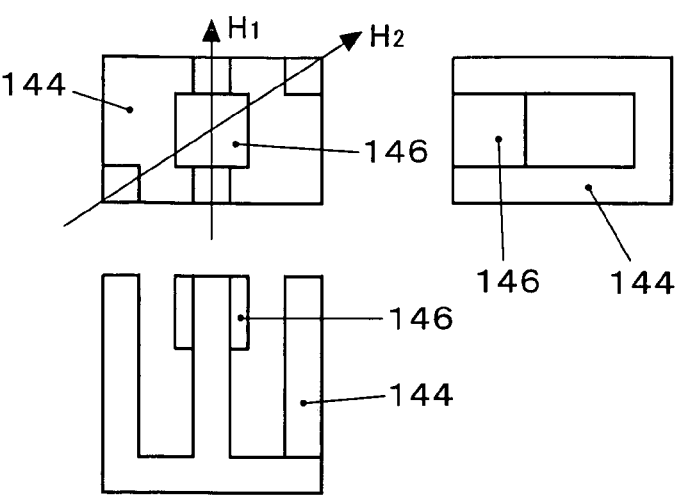
FIG. 14 is an explanatory view illustrating an example of another structure of a magneto-optical device.

As illustrated in FIG. 14, a magnetic yoke that can embody the above equation can be produced by cutting off three pertinent parts (two parallel parts and one part perpendicular to the others) of a rectangular-parallelepiped block made of a high-magnetic-permeability material. In a magnetic yoke 144, compared with the magnetic-pole positions for $H_1$, the magnetic-pole positions for $H_2$ are far from the center of a magneto-optical element 146, whereby the magnitude of the magnetic field $H_2$ to be applied to the magneto-optical element 146 is reduced; however, the reduced magnitude can be addressed, e.g., by increasing the number of windings. In addition, instead of a single-piece structure, by providing through-holes at predetermined positions in the tabular portion and inserting and fixing pillar members into the through-holes, the magnetic yoke may be produced, as is the case with FIGS. 11A to 11C.

Figure 15A:
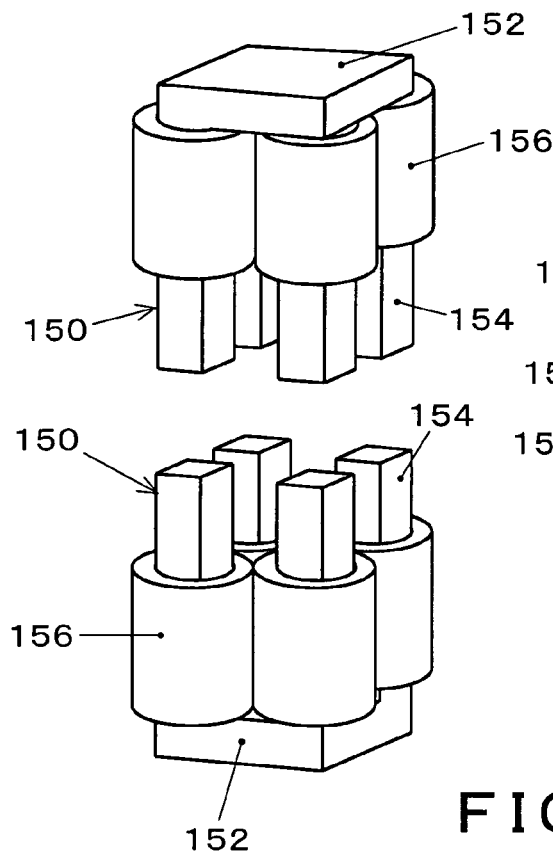
FIG. 15A is an explanatory view illustrating an example of further another structure of a magneto-optical device.
Figure 15B:
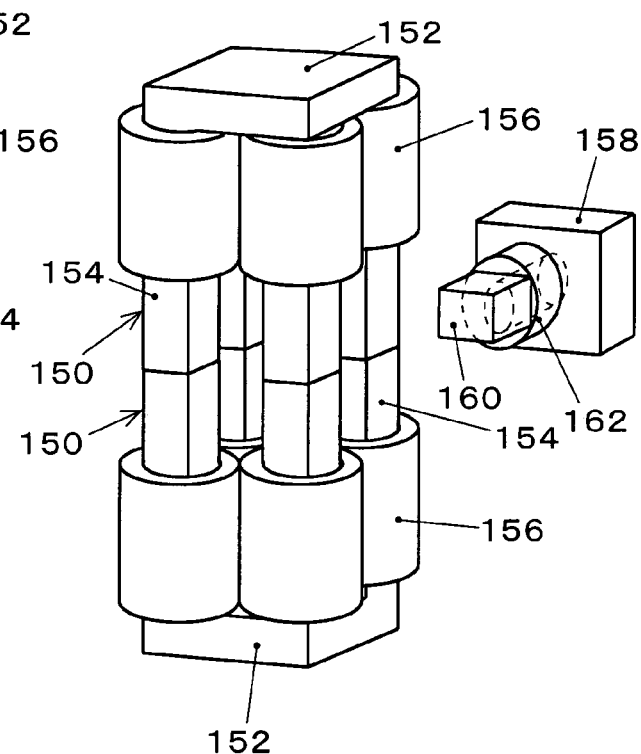
FIG. 15B is an explanatory view illustrating a condition in which the magnetic yokes in FIG. 15A are bonded.
Figure 15C:
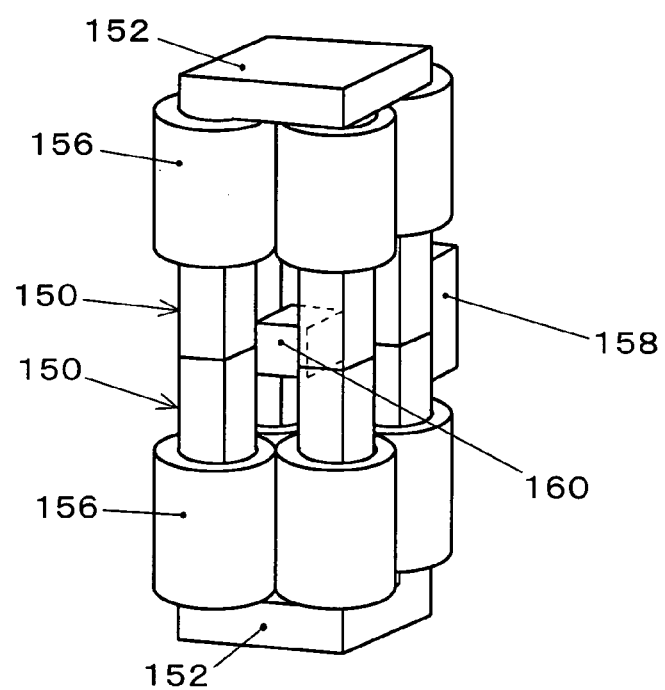
FIG. 15C is an explanatory view illustrating a condition in which a magneto-optical element is arranged in the open-magnetic-circuit space in FIG. 15B.

FIGS. 15A to 15C are explanatory views further illustrating another example of a magneto-optical device according to the present invention. Two magnetic yokes 150 as illustrated in FIGS. 6A to 6C are arranged opposing each other. In other words, each of the two magnetic yokes 150 has a single-piece structure, made of a high-magnetic-permeability material such as ferrite, that incorporates an approximately square tabular portion 152 and four pillar portions 154 protruding perpendicularly from four corners in the one surface of the tabular portion 152. Besides, coils 156 are wound around the respective pillar portions 154 (refer to FIG. 15A). The two magnetic yokes 150 around which the coils 156 are wound as described above are integrated in such a way that the foremost surfaces of the pillar portions 154 of the one magnetic yoke 150 butt against the foremost surfaces of the pillar portions 154 of the other magnetic yoke 150, and fixed through an adhesive or the like (refer to FIG. 15B). A cylindrical support 162 to which a magneto-optical element 160 is adhered is inserted into a through-hole provided in the center of a non-magnetic stage 158, and fixed therein (refer to FIG. 15B); the stage 158 is fixed to the magnetic yoke 150, through adhesion or the like, in such a way that the magneto-optical element 160 is situated in the open-magnetic-circuit space surrounded by the top ends of the respective pillar portions 154 (refer to FIG. 15C).

Accordingly, the magneto-optical device is configured in such a way that magnetic fields generated by the coils 156 are applied to the magneto-optical element 160. For that purpose, currents are applied to the coils in such a way that the directions of magnetic fields generated through the coils wound around the opposing pillar portions 154 are reverse to each other. That is to say, the currents are applied to the coils in such a way that, at the top ends of the opposing pillar portions 154, the respective magnetic poles generated through the respective coils 156 have the same polarity. As a result, magnetic fluxes leak out of the top ends of the pillar portions 154, whereby the magnetic fields efficiently act on the magneto-optical element 160. As is the case with FIGS. 6A to 6C, the polarities of magnetic fields applied to the magneto-optical element 160, through the coils 156 that are diagonally opposing each other with respect to the magneto-optical element 160, are reverse to each other. Moreover, the magneto-optical device is configured in such a way that the magnetic fields generated through the upper magnetic yoke and the lower magnetic yoke cooperatively (added to each other) act on the magneto-optical element 160.

Figure 16A:
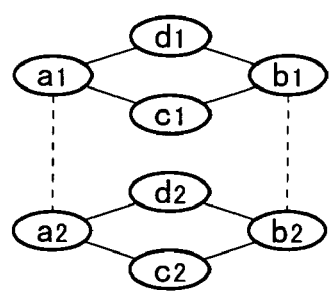
FIG. 16A is an explanatory diagram illustrating arrangement of coils.
Figure 16B:
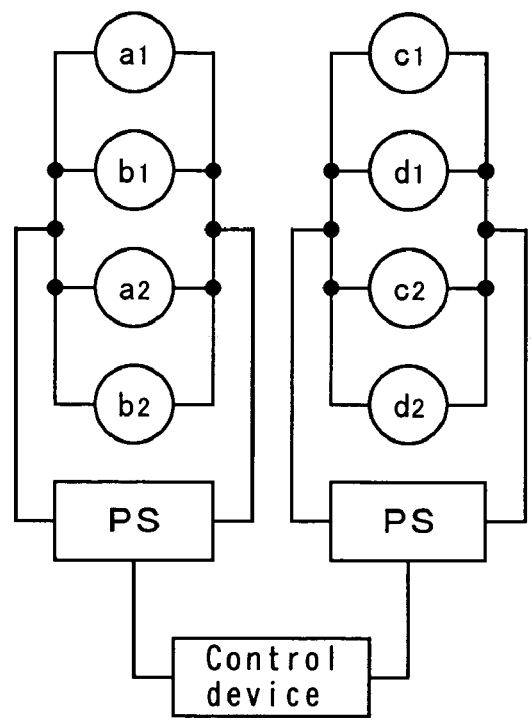
FIG. 16B is a circuit diagram illustrating wiring of coils and power supply units, in the case where two coils each are connected in parallel.

In addition, a set of four coils two each of which are diagonally opposing each other with respect to the magneto-optical element is driven by a common power supply unit. When FIG. 16A represents a positional relationship among the coils, as illustrated in FIG. 16B, totally four coils ($a_1$, $a_2$, $b_1$, and $b_2$), consisting of two coils vertically opposing each other with respect the incident optical axis and two other coils each diagonally opposing the two coils with respect to the magneto-optical element, that are wired in parallel with one another are connected with the one power supply unit; the residual four coils ($c_1$, $c_2$, $d_1$, and $d_2$) are also wired in parallel with one another and connected with the other power supply unit. Thus, the coils vertically opposing each other with respect the incident optical axis, e.g., $a_1$ and $a_2$ are set for N poles, and the coils $b_1$ and $b_2$ each diagonally opposing coils $a_1$ and $a_2$ with respect to the magneto-optical element are set for S poles. Similarly, if $c_1$ and $c_2$ are set for S poles, $d_1$ and $d_2$ are set for N poles.

Figure 16C:
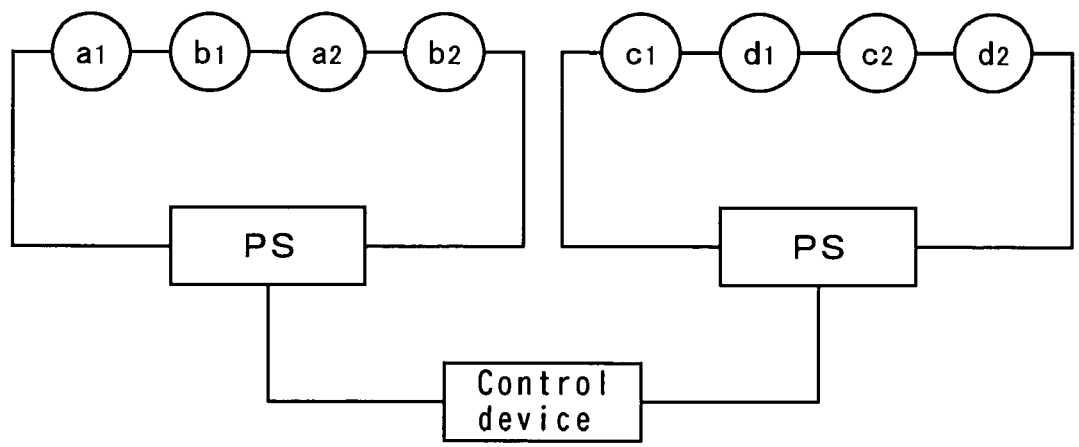
FIG. 16C is a circuit diagram illustrating wiring of coils and power supply units, in the case where two coils each are connected in series.

Additionally, as illustrated in FIG. 16C, the four coils ($a_1$, $a_2$, $b_1$, and $b_2$) and the residual four coils ($c_1$, $c_2$, $d_1$, and $d_2$) that are wired in series may be connected with the one power supply unit and the other power supply unit, respectively. Alternatively, a method is also possible in which two each of the coils are wired in parallel-series, or in series-parallel, and connected with a common power supply unit. At any rate, compared with a method in which eight coils that are connected with respective power supply units are controlled separately, the circuit configuration can significantly be simplified, the costs are reduced, and the control is not rendered complicated. A control method to obtain a desired Faraday rotation angle is the same as that in the case where the magnetic yoke is provided only at one side.

Figure 17A:
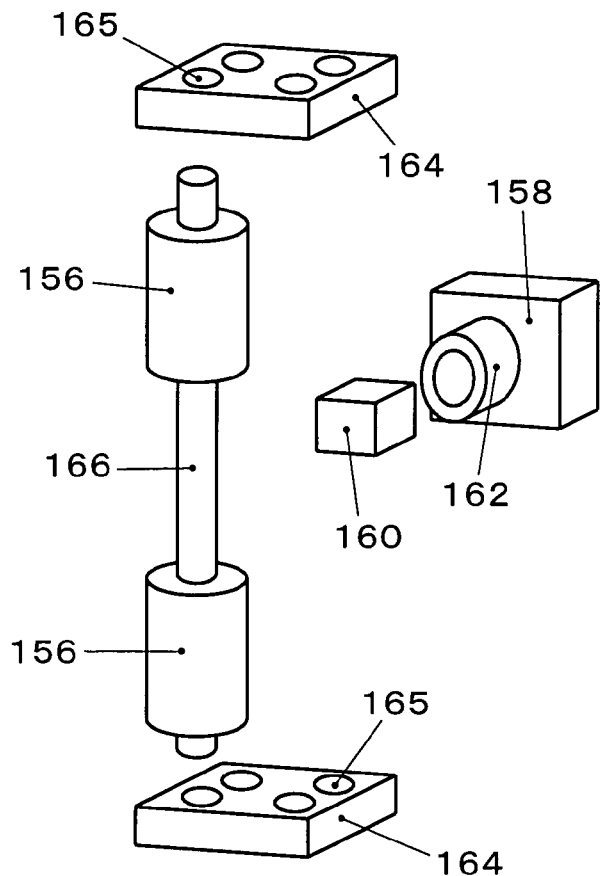
FIG. 17A is an explanatory view illustrating an example of another structure of a magneto-optical device.
Figure 17B:
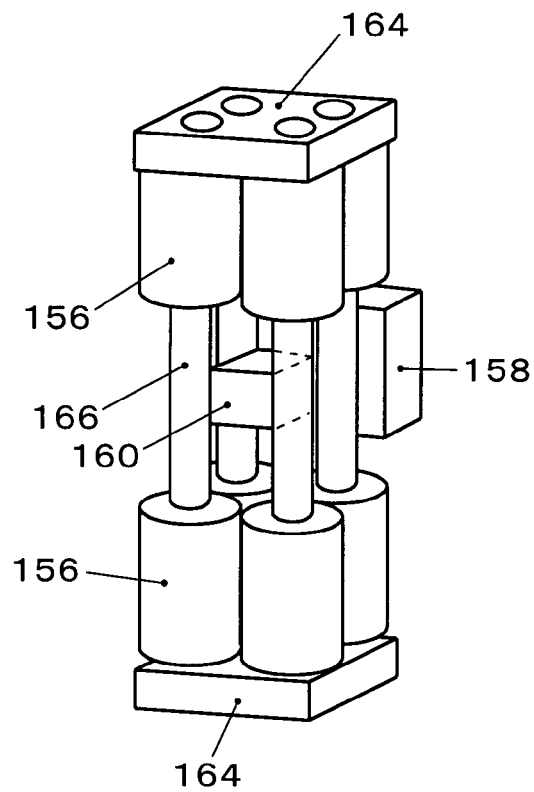
FIG. 17B is a perspective view illustrating a condition after the magneto-optical device in FIG. 17A has been assembled.

FIGS. 17A and 17B are explanatory views illustrating another example of a magneto-optical device according to the present invention. Four pillar portions 166 are arranged between tabular portions 164 that are spaced apart from and opposing each other, and 2 coils 156 are wound around each of the pillar portions 166. The magneto-optical device is configured in such away that, by arranging the magneto-optical element 160 in a space surrounded by middle portions of the respective pillar portions 166, magnetic fields generated by the coils 156 are applied to the magneto-optical element 160. By providing holes 165 at the four corners of both tabular portions 164, inserting thereinto both ends of the respective pillar portions 166, and fixing therein the ends of the pillar portions 166, through an adhesive or the like, a single-piece magnetic yoke made of a high-magnetic-permeability material can be obtained. Two coils wound around the same pillar portion 166 generate magnetic fields that are reverse to each other; the directions of magnetic fields applied, through the coils diagonally opposing each other with respect to the magneto-optical element 160, to the magneto-optical element 160 are reverse to each other; assuming that the middle portion of the pillar portion is a boundary, the magnetic field generated through the top-half magnetic yoke and the magnetic field generated through the bottom-half magnetic yoke cooperatively act on the magneto-optical element; and the coils opposing each other with respect to the magneto-optical element 160 is driven, as a set, by a common power supply unit. The operation of the magneto-optical device is the same as that of the foregoing embodiments.

In addition, the foregoing embodiments are examples in which four pillar portions are provided in a tabular portion; however, a structure may also be possible in which more pillar portions, e.g., six pillar portions are provided.

Figure 18:
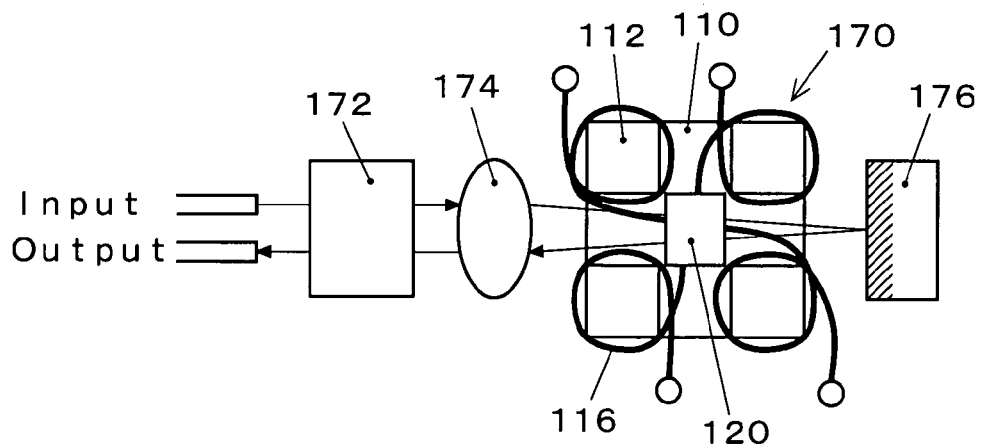
FIG. 18 is an explanatory diagram illustrating an application example of a magneto-optical device applied to a variable optical attenuator.

FIG. 18 is a diagram illustrating an application example of a reflection-type variable optical attenuator including a magneto-optical device according to the present invention. A configuration is employed in which, before the magneto-optical device 170, a light polarizer 172 made of a birefringence crystal and a lens 174 are arranged along the light path, and after the magneto-optical device 170, a mirror 176 is arranged along the light path. The magneto-optical device 170 may be identical to that illustrated in FIGS. 6A to 6C; for simplicity, corresponding members are designated by the same reference characters. Light is made to enter through an input optical fiber, and output light is extracted through an output optical fiber. The example employs a configuration in which coils are connected in series (refer to FIG. 9B).

Figure 19A:
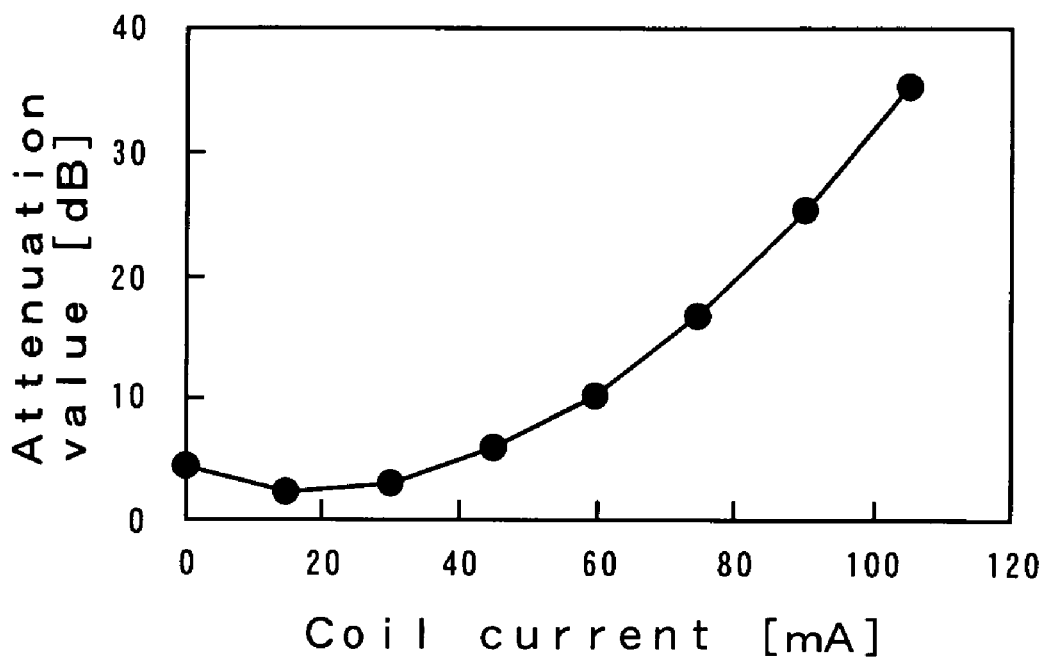
FIG. 19A is an explanatory graph representing an example of the optical attenuation properties of a variable optical attenuator.
Figure 19B:
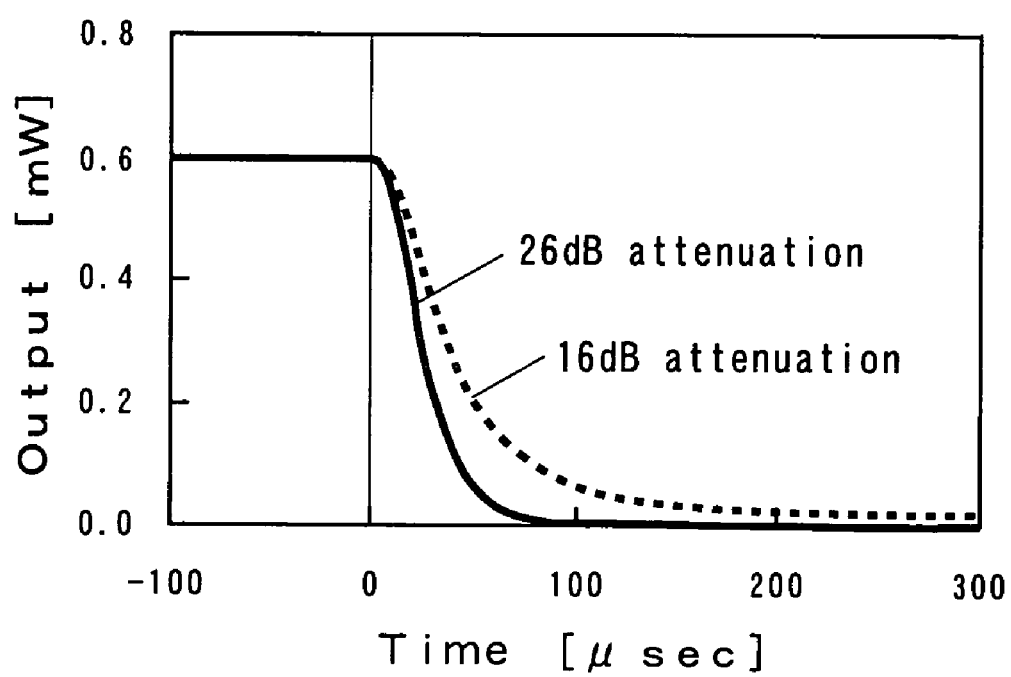
FIG. 19B is an explanatory graph representing an example of the response properties of a variable optical attenuator.

FIGS. 19A and 19B are graphs representing an example of results of measurement on a prototype. FIG. 19A represents the optical-attenuation properties versus the current of Coil 1 (the coils a and b) in the case where the current of Coil 2 (the coils c and d) is fixed to 80 mA. Additionally, FIG. 19B represents the response properties versus the step input to Coil 1 with the attenuation value of 16 dB or 26 dB. In the case where the attenuation value was 26 dB, the response time constant (attenuation value: reaching down to 63%) was 24 µsec.

EMBODIMENT 3

Figure 20:
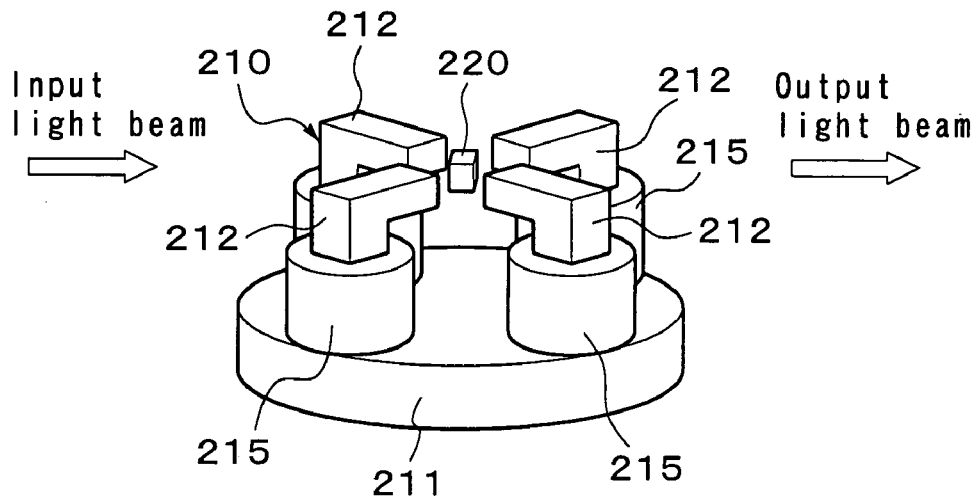
FIG. 20 is an explanatory view illustrating Embodiment 3 of a magneto-optical device according to the present invention.

Embodiment 3 of a magneto-optical device according to the present invention will be explained with reference to FIGS. 20 to 28. As illustrated in FIG. 20, a magneto-optical device according to Embodiment 3 includes a magnetic yoke 210, coils 215 wound around the magnetic yoke 210, and a magneto-optical element 220. The magnetic yoke 210 has a configuration in which a disk-shaped tabular portion 211 and four inverted L-shaped pillar portions 212 protruding from a peripheral portion of the one surface of the tabular portion 211 are incorporated, the respective pillar portions 212 are arranged, along the circumference of the tabular portion 211, spaced approximately the same distance apart from one another, and the respective top ends of the pillar portions 212 are facing the center of the pillar portions 212. The tabular portion 211 is made of, e.g., a semi-hard magnetic material such as SUS420J2; the pillar portions 212 are made of a soft-magnetic material such as Mn—Zn-system ferrite. The tabular portion 211 and each of the pillar portions 212 are fixed to each other, through an adhesive or the like.

The coils 215 are wound around the respective pillar portions 212, and the magneto-optical element 220 is arranged in an open-magnetic-circuit space surrounded by the top ends of the four pillar portions 212; accordingly, the combined magnetic field generated through the coils 215 is applied to the magneto-optical element 220. As is the case with Embodiments 1 and 2 described above, the polarities of magnetic fields applied to the magneto-optical element 220, through the coils 215 that are diagonally opposing each other with respect to the magneto-optical element 220, are reverse to each other; the coils 215 are connected in parallel or in series with a power supply unit. In addition, the number of windings of the coil 215 can arbitrarily be set, and, by changing the number of windings, the magnetomotive force of the coil 215 can be adjusted; however, for simplicity, explanation will be implemented on the assumption that the magnetomotive force is adjusted through the current supplied to the coil 215.

Figure 21A:
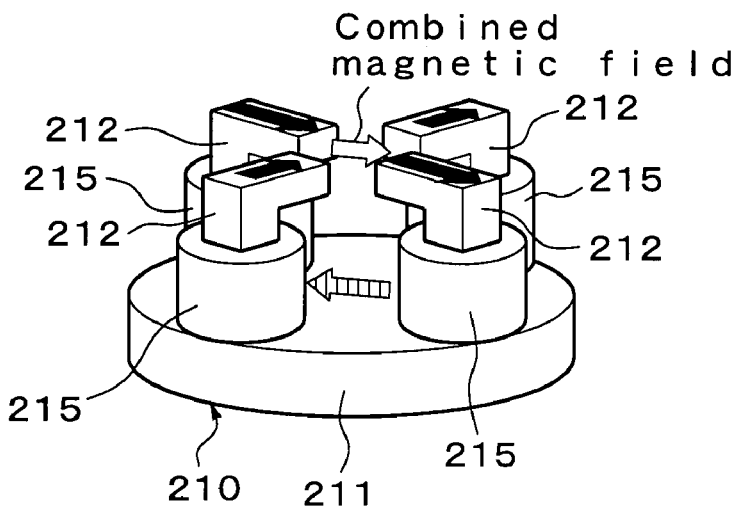
FIG. 21A is an explanatory view illustrating an example of the magnetization direction of a magnetic yoke and the direction of a combined magnetic field, in the case where currents are applied.

In the magneto-optical device configured as described above, by supplying currents to the four coils 215, the magnetomotive force is generated in each of the coils 215. Besides, by controlling the directions and the ratios of currents supplied to the four coils 215, a combined magnetic field (spatial magnetic field) having an arbitrary direction can be formed in an open-magnetic-circuit space as an objective space. When respective currents are supplied to the coils 215, for example as illustrated in FIG. 21A, the respective pillar portions 212 of the magnetic yoke 210 are magnetized in a predetermined direction (e.g., in the direction indicated in FIG. 21A); however, the tabular portion 211 made of a semi-hard magnetic material is also magnetized in a predetermined direction (e.g., in the direction indicated in FIG. 21A), while forming a magnetic circuit along with the pillar portions 212. Because the magnetization direction of the tabular portion 211 has a distribution, in effect, the magnetization is more complicated than that illustrated in FIG. 21A; however, the magnetization as a whole of the tabular portion 211 is exemplified, as illustrated in FIG. 21A.

Figure 21B:
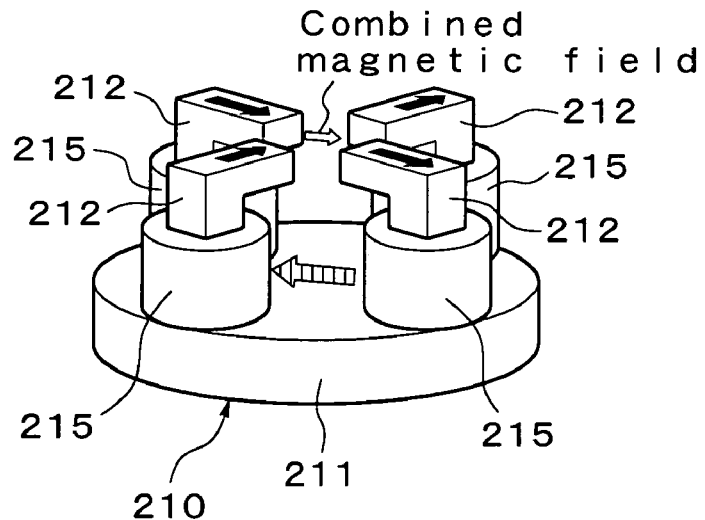
FIG. 21B is an explanatory view illustrating an example of the magnetization direction of a magnetic yoke and the direction of a combined magnetic field, in the case where currents are cut off.

In this situation, if exciting currents for the respective coils 215 are cut off, the magnetomotive force generated through the coils 215 disappear; however, magnetization remains in the tabular portion 211 that is made of a semi-hard magnetic material. After the exciting currents have been cut off, as illustrated in FIG. 21B, due to the residual magnetization in the tabular portion 211, the pillar portions 212 that are made of a soft-magnetic material are magnetized, whereby a combined magnetic field having the same direction as that of the magnetization in the case where the currents are applied is formed in the open-magnetic-circuit space as an objective space. In other words, by controlling the ratios of the exciting currents applied to the respective coils 215, the residual magnetization direction as a whole of the tabular portion 211 can arbitrarily be changed; as a result, the direction of a magnetic field that remains in the open-magnetic-circuit space can arbitrarily be changed. In magnetizing the tabular portion 211 in a target direction, the absolute values of the exciting currents applied to the respective coils 215 are increased, with the ratios of the exciting currents maintained. It is preferable in terms of control to adjust the values of the currents so that the pillar portions 212 are not magnetically saturated.

In addition, in changing the direction of the combined magnetic field applied to the magneto-optical element 220, it is preferable to apply electric power that is large enough, compared with the residual magnetization in the tabular portion 211, or to demagnetize the tabular portion 211, by controlling the currents supplied to the respective coils 215, and then to form a combined magnetic field in the open-magnetic-circuit space. Accordingly, the effect of the residual magnetization before the change of the direction of the combined magnetic field is nullified, whereby the direction of the combined magnetic field can appropriately be controlled in a desired direction. Moreover, in the foregoing magnetic circuit in FIG. 20, the direction of the combined magnetic field applied to the magneto-optical element 220 can be controlled so as to be oriented arbitrarily on a plane (a plane on which the top ends of the respective pillar portions 212 are situated); by combining with that magnetic circuit that can generate a magnetic-field vector having a component in a direction perpendicular to the plane, as illustrated in FIGS. 22 and 23, the direction of the combined magnetic field applied to the magneto-optical element 220 can be controlled so as to be oriented arbitrarily in a 3-dimensional space.

Figure 22:
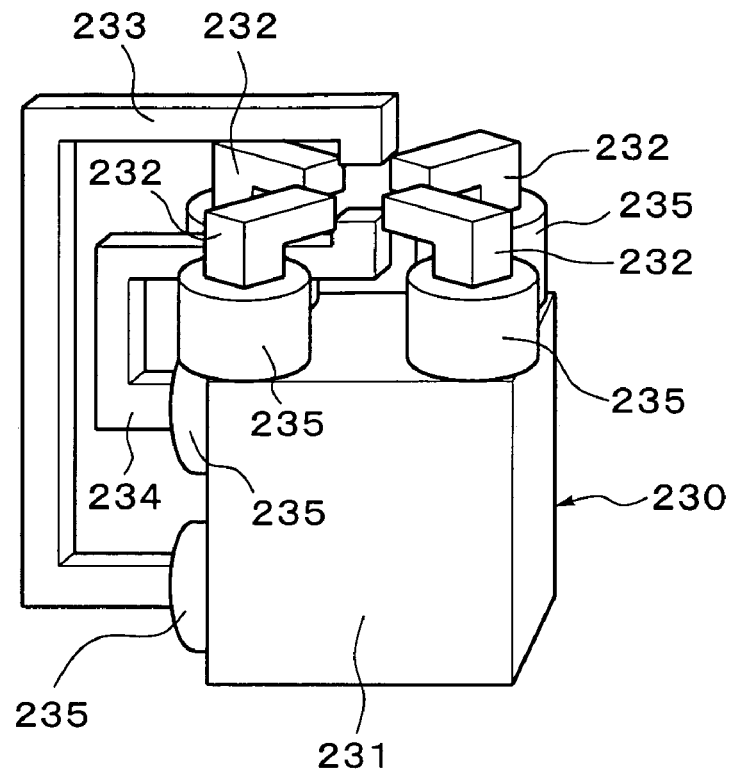
FIG. 22 is an explanatory view illustrating an example of another structure of a magnetic yoke.
Figure 23:
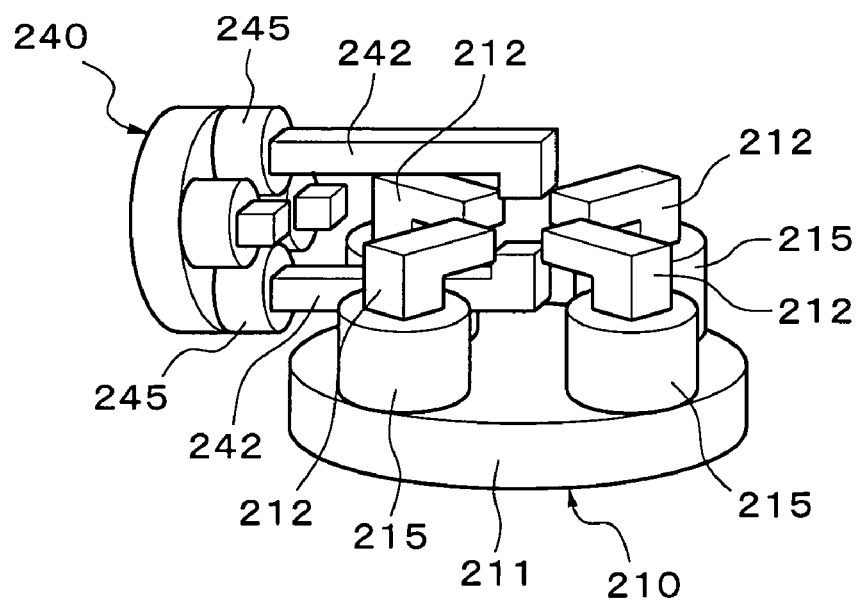
FIG. 23 is an explanatory view illustrating an example of further another structure of a magnetic yoke.

In FIG. 22, the magnetic yoke 230 is comprised of a block-shaped base portion 231 made of a semi-hard magnetic material and six pillar portions 232, 233, and 234 protruding from the top and side surfaces of the base portion 231. The base portion 231 has, e.g., a cuboid shape; the four pillar portions 232 protrude perpendicularly from the vicinities of the four corners of the top surface of the base portion 231, and the respective top ends of the pillar portions 232 are oriented to a open-magnetic-circuit space that is surrounded by the top ends; from the one side surface of the base portion 231, the pillar portions 234 and 233 protrude that extend from the upper and the lower portions, respectively, of the side surface, and whose top ends lead to a position below and a position above the open-magnetic-circuit space, respectively. Coils 235 are wound around the respective pillar portions 232, 233, and 234. In contrast, in FIG. 23, a first magnetic yoke 210 having the four pillar portions 212 as illustrated in FIG. 20 described above and a second magnetic yoke 240 having two pillar portions 242 are provided; arrangement is implemented in such a way that an open-magnetic-circuit space surrounded by the top ends of the pillar portions 212 of the first magnetic yoke 210 are sandwiched between the top ends of the two pillar portions 242 of the second magnetic yoke 240, from the upper and lower sides thereof. A tabular portion 241 of the second magnetic yoke 240 is formed of a semi-hard magnetic material, and the pillar portion 242 is formed of a soft-magnetic material. Coils 245 are wound around the respective pillar portions 242. In both cases, the direction of the combined magnetic field applied to the magneto-optical element 220 can be controlled so as to be in an arbitrary direction in a 3-dimentional space, and the direction can be maintained after the exciting currents have been cut off.

Figure 24:
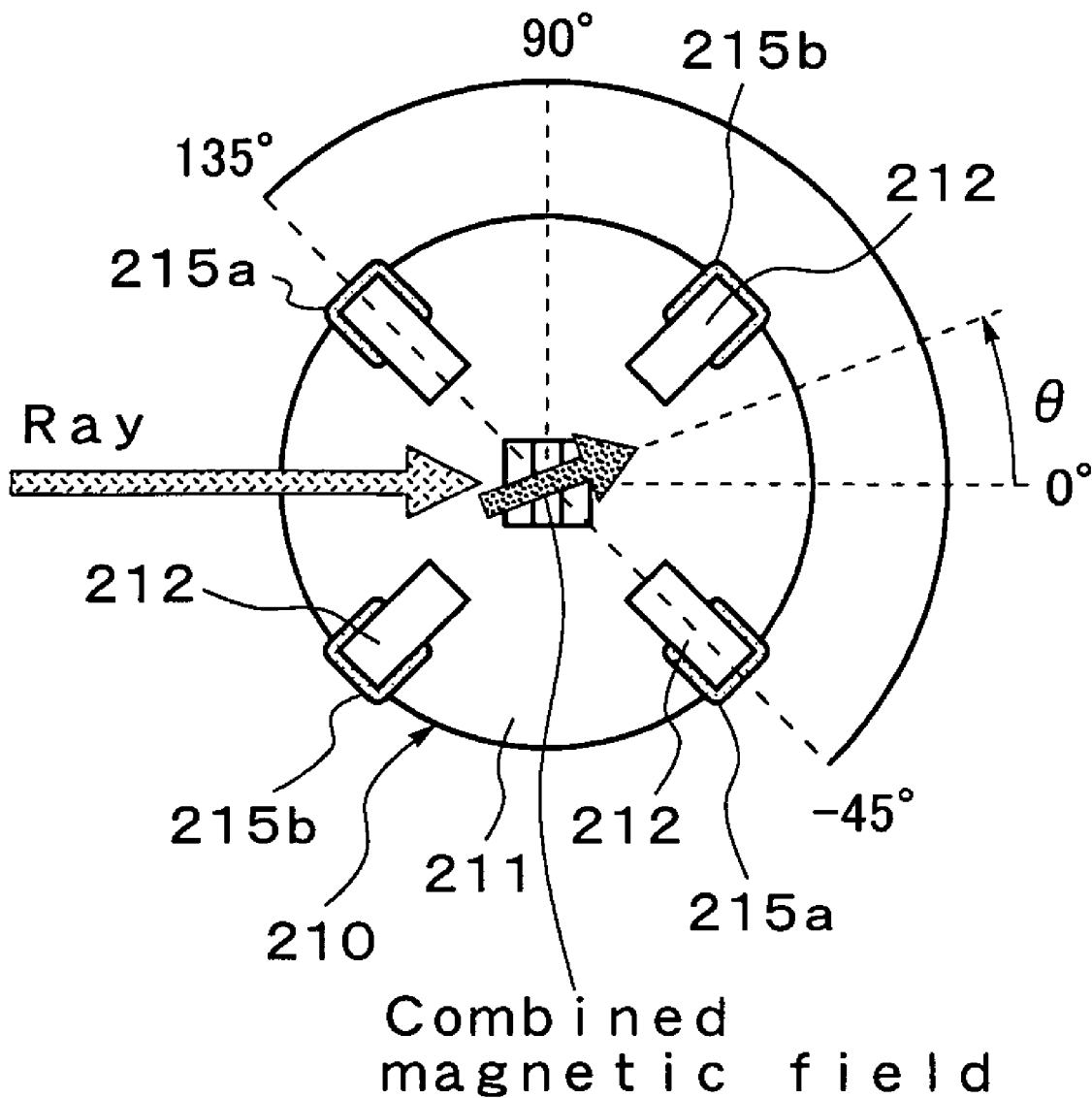
FIG. 24 is an explanatory chart representing an example of the angle between the direction of a combined magnetic field and the traveling direction of a ray.
Figure 25A:
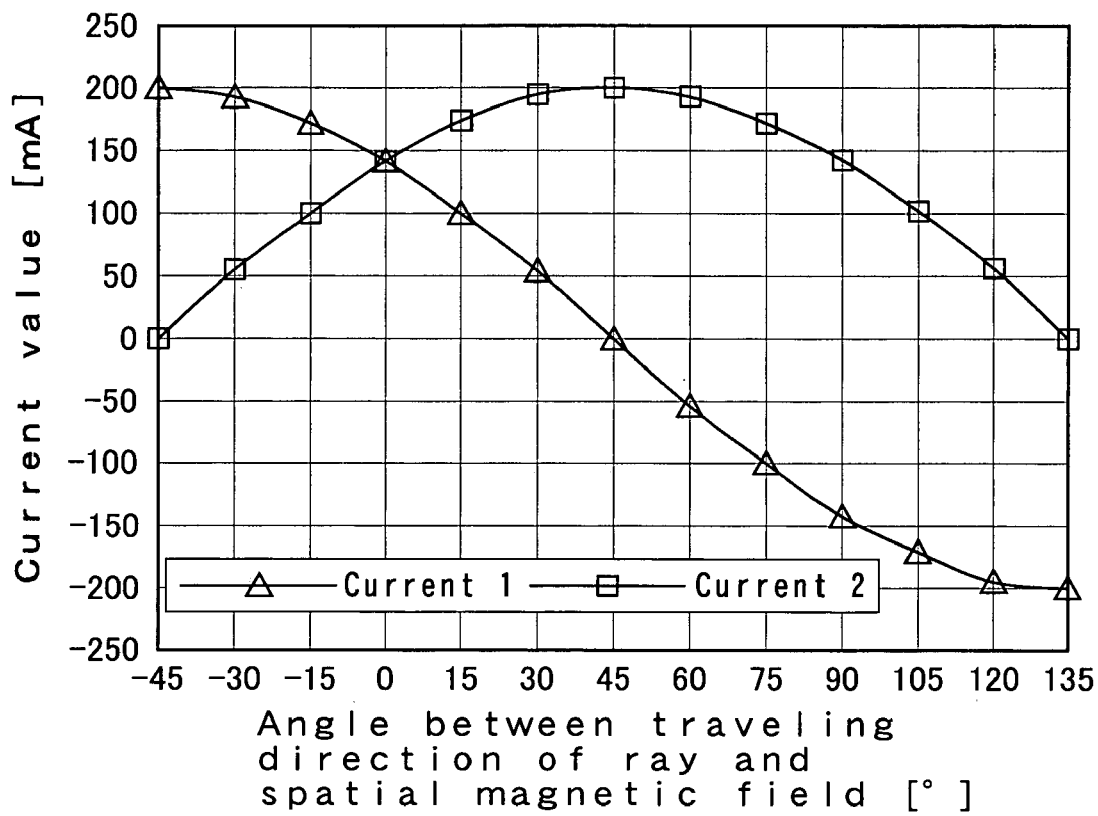
FIG. 25A is a graph representing an example of the relationship between the direction of a combined magnetic field and the current.

As an example of a magneto-optical device according to the present invention, a Faraday rotator as illustrated in FIG. 20 was produced. For the pillar portion 212, silicon steel that is a soft-magnetic material and 3 mm by 3.3 mm in end face and 14 mm in height was utilized. For the tabular portion 211, SUS420J2 that is a semi-hard magnetic material and 40 mm in diameter and 0.4 mm in thickness was utilized. For the magneto-optical element 220, bismuth-substituted garnet single crystal of 1 mm by 1.2 mm by 0.98 mm in size was selected, and a crystal length was selected with which, in the case of input light having a wavelength of 1550 nm, the maximal value of the Faraday rotation angle becomes 90°. In addition, the number of windings of each of the coils 215 was set to 800; the coils 215 that are diagonally opposing each other with respect to the magneto-optical element 220 were connected in series with a power supply unit, and two power-supply systems were utilized. As illustrated in FIG. 24, if, out of two pairs of coils that are connected in series, the one pair is designated by 215a and the other is designated by 215b, and the currents to be applied to the respective pairs of coils are designated by current 1 and current 2, respectively, the angle θ between the direction of the combined magnetic field in the open-magnetic-circuit space and the traveling direction of a ray, and the current values of the respective current systems had a relationship therebetween as represented in FIG. 25A. It can be seen that by controlling the currents 1 and 2, a combined magnetic field can be formed in an arbitrary direction in the open-magnetic-circuit space.

Figure 25B:
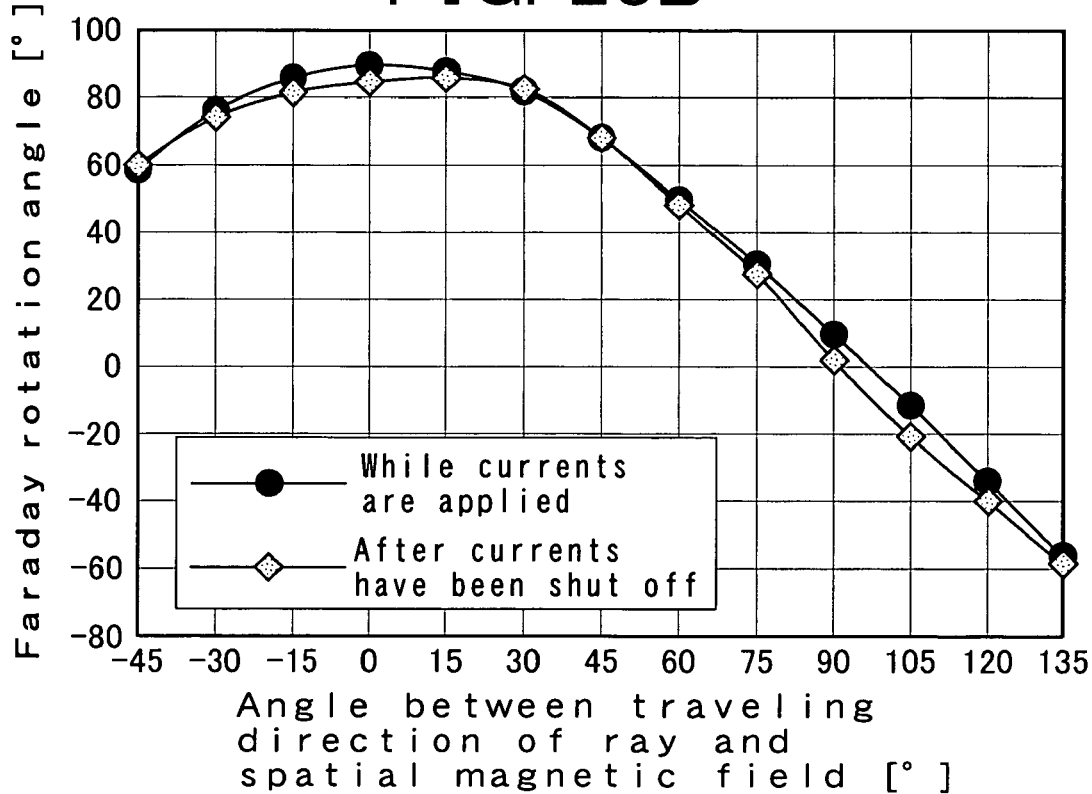
FIG. 25B is a graph representing an example of measurement on the Faraday rotation angle, in the case where currents are applied and after the currents are cut off.

With a self-latching Faraday rotator configured as described above, by setting the maximal values of the currents applied to the respective coils 215a and 215b to 250 mA and controlling the ratios and the directions of the currents, the Faraday rotation angle can arbitrarily be adjusted over a range from −90° to +90°, and after the currents for the respective coils 215a and 215b are cut off, the Faraday rotation angle in the case where the currents have been applied can be maintained. In other words, a self-latching Faraday rotator can be realized in which the Faraday rotation angle after the currents for the respective coils 215a and 215b are cut off is an arbitrary angle over a range from −90° to +90°. FIG. 25B represents the results of measurement on the Faraday rotation angle in the case where the angle θ between the direction of the combined magnetic field in the open-magnetic-circuit space and the traveling direction of a ray is over a range from −45° to +135°. It can be seen that, even after the currents for the coils 215a and 215b are cut off, the Faraday rotation angle can be maintained in the condition that is approximately the same as that in the case where the currents have been applied.

Figure 26:
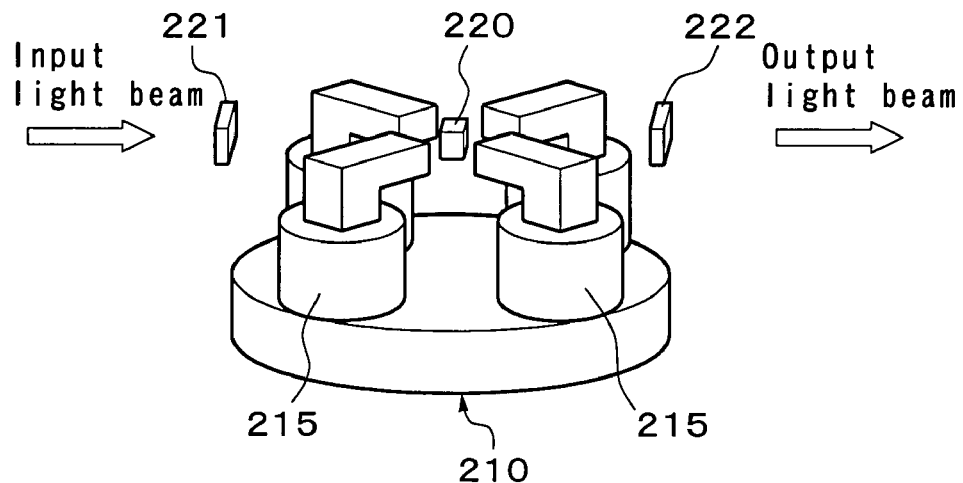
FIG. 26 is an explanatory diagram illustrating an example of a magneto-optical device applied to a variable optical attenuator.

FIG. 26 is an explanatory view illustrating an example of a self-latching variable optical attenuator including a magneto-optical device according to the present invention. A configuration is employed in which, before and after the magneto-optical device, a light polarizer 221 and an analyzer 222 are arranged along the light path. The magneto-optical device may be identical to that illustrated in FIG. 20; for simplicity, corresponding members are designated by the same reference characters.

In this situation, for the four pillar portions 212, silicon steel that is a soft-magnetic material was utilized, and for the tabular portion 211, SUS410J1 that is a semi-hard magnetic material was utilized; heat treatment was applied to both materials, under appropriate conditions. The number of windings of each of the coils 215 was set to 400; a configuration was employed in which the coils 215 that are diagonally opposing each other and wired in series are connected with a power supply unit in such a way that the polarities that appear at the respective top ends of the pillar portions 212 opposing each other with respect to the magneto-optical element 220 are reverse to each other, and the control is implemented through two current systems. The magneto-optical element 220 is a bismuth-substituted garnet single crystal; the light polarizer 221 and the analyzer 222 are rutile single crystals. The magneto-optical element 220 was 1 mm by 1.7 mm by 0.98 mm in size, and a crystal length was selected with which, in the case of input light having a wavelength of 1550 nm, the maximal value of the Faraday rotation angle becomes 90°. The rutile single crystals configured a cross-Nicol arrangement, so that, in the case where the rotation angle of the Faraday rotator was 90°, the minimal attenuation value was obtained, and in the case where the rotation angle of the Faraday rotator was 0°, the maximal attenuation value was obtained.

Figure 27:
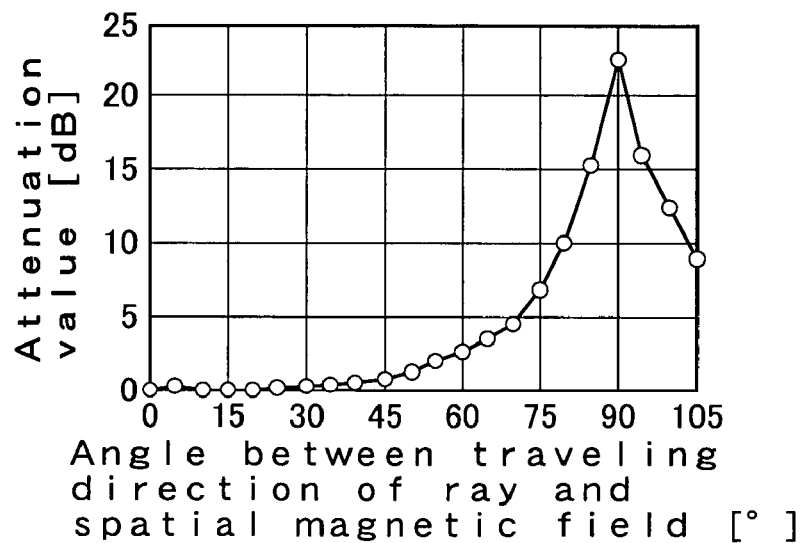
FIG. 27 is an explanatory graph representing an example of the optical attenuation properties of the variable optical attenuator in FIG. 26.

According to the self-latching variable optical attenuator configured as described above, by setting the maximal values of the currents applied to the respective coils 215 to 250 mA and controlling the ratios and the directions of the currents, the Faraday rotation angle can be converted into a desired angle, and, as represented in FIG. 27, the value of light attenuation can be adjusted to an arbitrary value over a range from 1 dB to 22 dB. Besides, after the currents for the respective coils 215 are cut off, the Faraday rotation angle is maintained in the condition as the currents have been applied; therefore, the value of light attenuation can also be maintained in the condition as the currents have been applied. In other words, a self-latching variable optical attenuator can be realized in which, the value of light attenuation obtained after the currents for the respective coils 215 are cut off is arbitrary over a range from 1 dB to 22 dB. The device is 47 mm by 47 mm by 25 mm in size.

Figure 28:
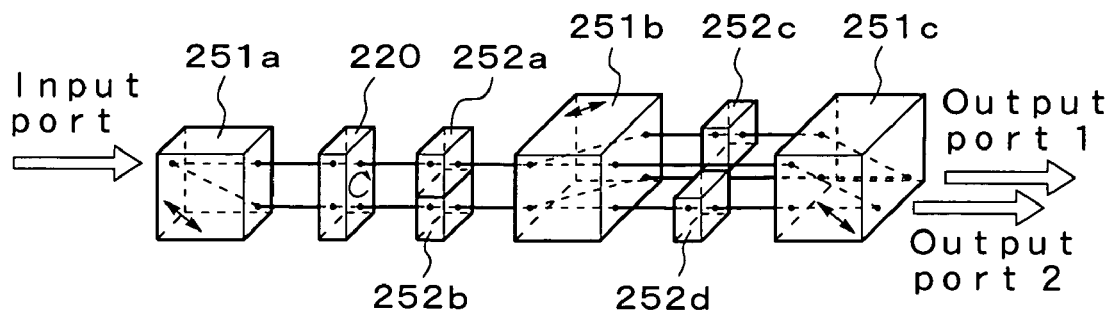
FIG. 28 is an explanatory diagram illustrating an example of a magneto-optical device applied to a variable optical splitter.

FIG. 28 is an explanatory view illustrating an example of a self-latching variable optical splitter including a magneto-optical device according to the present invention. The optical splitter is configures in such a way that, from the input-port side to the output-port side, a rutile single crystal plate 251a, a magneto-optical device, ½-wavelength plates 252a and 252b, a rutile single crystal plate 251b, ½-wavelength plates 252c and 252d, and a rutile single crystal plate 251c are arranged in that order. The magneto-optical device is a self-latching Faraday rotator, among self-latching Faraday rotators as illustrated in FIG. 20, that utilizes the magneto-optical element 220 that provides a Faraday rotation angle of 90°. In FIG. 28, the magnetic-circuit portion of the Faraday rotator is omitted. In addition, the directions of the crystal axes of the three rutile single crystal plates 251a, 251b, and 251c are indicated by the arrows in FIG. 28; the rutile single crystal plate 251a has a function of splitting a ray consisting of subrays that are in the same light path and whose polarization directions are perpendicular to each other; the rutile single crystal plate 251b has a function of controlling a light path in accordance with a polarization direction; and the rutile single crystal plate 251c has a function of synthesizing rays that are in different light paths and whose polarization directions are perpendicular to each other. The four ½-wavelength plates 252a, 252b, 252c, and 252d each have a function of rotating by a predetermined angle the polarization direction of a ray.

In the self-latching variable optical splitter configured as described above, an incident ray to the input port are separated into two subrays, and the subrays are emitted through output port 1 and output port 2; the separation ratio can be controlled through the values of currents supplied to the Faraday rotator. The separation ratio excluding the insertion loss can be varied over a range from 0:100 to 100:0; obtained crosstalk values were above 42 dB. After the currents for the Faraday rotator are cut off, the Faraday rotation angle is maintained in the condition in the case where the currents have been applied; therefore, as is the case where the currents have been applied, an arbitrary separation ratio can be maintained.

By combining the magneto-optical device illustrated in FIG. 20, a rutile single crystal plate, and a ½-wavelength plate, it is possible to configure a self-latching variable optical switch. According to the self-latching variable optical switch, by controlling the ratios and directions of the currents applied to the respective coils 215, the light path can be switched so as to be in a desired condition, and after the currents for the coils 215 are cut off, the condition can be maintained. Moreover, in Embodiment 3, the pillar portion is formed of a soft-magnetic material, and the tabular portion is formed of a semi-hard magnetic material; conversely, it is possible that the pillar portion is formed of a semi-hard magnetic material, and the tabular portion is formed of a soft-magnetic material. In this case as well, after the exciting currents are cut off, the direction of the combined magnetic field that remains in the open-magnetic-circuit space can be controlled so as to be in an arbitrary direction, whereby the Faraday rotation angle can be maintained so as to be in an arbitrary condition.

INDUSTRIAL APPLICABILITY

A magneto-optical device according to the present invention can be utilized in a variable optical attenuator, a variable optical splitter, or the Faraday rotator in a optical switch. By generating variable magnetic fields by utilizing electromagnets only, without utilizing any fixed magnetic field of a permanent magnet, the magnetization direction can instantaneously be changed, whereby the magneto-optical device can be downsized and its operation is speeded up. Since, regardless of the direction of the combined magnetic field, no large magnetic field is required, the coils can be downsized, whereby the driving voltage can also be reduced.

Since a pair of coils diagonally opposing each other with respect to a magneto-optical element is configured and the coils in the pair are wired in parallel or in series and driven by a common power supply unit, the drive of the coils can efficiently be implemented with a small number of power supply units, whereby the peripheral circuitry can be simplified.

Moreover, by forming with a semi-hard magnetic material the tabular portion or the pillar portion of the magnetic yoke, even after the exciting currents are cut off, the direction of the combined magnetic field that remains in the open-magnetic-circuit space can be controlled so as to be in an arbitrary direction, whereby the Faraday rotation angle can be maintained so as to be in an arbitrary condition.

The invention claimed is:

1. A magneto-optical device comprising:
a magnetic yoke made of a high-magnetic-permeability material, the magnetic yoke including a tabular portion, and at least three pillar portions protruding perpendicularly from one side of the tabular portion;
coils wound around the pillar portions; and
a magneto-optical element arranged in an open-magnetic-circuit space surrounded by the respective top-end portions of the pillar portions, wherein magnetic fields generated through the coils are applied to the magneto-optical element.

2. The magneto-optical device according to claim 1, wherein the magnetic yoke has a structure in which an approximately quadrangular tabular portion and four quadrangular pillar portions protruding from the vicinities of the four corners of the tabular portion, perpendicularly and in the same direction, are continuously integrated.

3. The magneto-optical device according to claim 1, wherein as the high-magnetic-permeability material, ferrite is utilized, and for the magneto-optical element, a bismuth-substituted rare-earth iron-garnet single crystal is utilized.

4. The magneto-optical device according to claim 1, wherein, by controlling respective directions and/or values of electric currents supplied to the coils, the magnetization direction of the magneto-optical element can be changed.

5. The magneto-optical device according to claim 1, wherein the magnetic yoke has a structure having 2n (where $n \geq 2$) pillar portions protruding perpendicularly from one side of the tabular portion; the polarities of magnetic fields applied to the magneto-optical element, through the coils diagonally opposing each other with respect to the magneto-optical element, are reverse to each other; and a pair of the coils that are diagonally opposing each other with respect to the magneto-optical element and connected in parallel or in series is driven by a common power supply unit.

6. The magneto-optical device according to claim 1, wherein the tabular portion of the magnetic yoke is formed of a semi-hard magnetic material, and the pillar portion is formed of a soft-magnetic material.

7. A variable optical attenuator for, with light polarizers arranged before and after a magneto-optical device in the light path thereof, controlling an attenuation value of output optical power versus input optical power, the magneto-optical device comprising:
a magnetic yoke made of a high-magnetic-permeability material, the magnetic yoke including a tabular portion, and at least three pillar portions protruding perpendicularly from one side of the tabular portion;
coils wound around the pillar portions; and
a magneto-optical element arranged in an open-magnetic-circuit space surrounded by the respective top-end portions of the pillar portions, wherein magnetic fields generated through the coils are applied to the magneto-optical element, and the magnetization direction of the magneto-optical element can be changed, by controlling respective directions and/or values of electric currents supplied to the coils.

8. An optical switch for controlling switchedly output light versus input light, the optical switch having a configuration in which light polarizers are arranged before and after a magneto-optical device in the light path thereof, and residual-magnetization-natured bismuth-substituted rare-earth iron garnet single crystal is utilized as a magneto-optical element, the magneto-optical device comprising:
a magnetic yoke made of a high-magnetic-permeability material, the magnetic yoke including a tabular portion, and at least three pillar portions protruding perpendicularly from one side of the tabular portion;
coils wound around the pillar portions; and
a magneto-optical element arranged in an open-magnetic-circuit space surrounded by the respective top-end portions of the pillar portions, wherein a magnetic field generated through the coils is applied to the magneto-optical element, and the magnetization direction of the magneto-optical element can be changed, by controlling respective directions and/or values of electric currents supplied to the coils.

9. A magneto-optical device array in which magneto-optical devices are arranged side by side, the magneto-optical device comprising:
a magnetic yoke made of a high-magnetic-permeability material, the magnetic yoke including a tabular portion and at least three pillar portions protruding perpendicularly from one side of the tabular portion;
coils wound around the pillar portions; and
a magneto-optical element arranged in an open-magnetic-circuit space surrounded by the respective top-end portions of the pillar portions, wherein magnetic fields generated through the coils are applied to the magneto-optical element.

10. A magneto-optical device comprising:
a magnetic yoke made of a high-magnetic-permeability material, the magnetic yoke including 2n (where $n \geq 2$) pillar portions protruding perpendicularly from one side of a tabular portion;
coils wound around the pillar portions; and
a magneto-optical element arranged in an open-magnetic-circuit space surrounded by the respective top-end portions of the pillar portions, wherein: magnetic fields generated through the coils are applied to the magneto-optical element; the polarities of magnetic fields applied to the magneto-optical element, through the coils diagonally opposing each other with respect to the magneto-optical element, are reverse to each other; and a pair of the coils that are diagonally opposing each other with respect to the magneto-optical element and connected in parallel or in series is driven by a common power supply unit.

11. The magneto-optical device according to claim 10, wherein the magnetic yoke has a structure having an approximately square tabular portion and four pillar portions protruding from the vicinities of the four corners of the tabular portion, perpendicularly and in the same direction.

12. The magneto-optical device according to claim 10, wherein the magnetic yoke has a tabular portion and pillar portions protruding in the same direction from one side of the tabular portion, and one pair of the pillar portions opposing each other with respect to the magneto-optical element is arranged perpendicular to the optical axis of the magneto-optical element and the other pair of the pillar portions opposing each other with respect to the magneto-optical element is arranged at a specific angle (smaller than ±90°) from the optical axis.

13. The magneto-optical device according to claim 12, wherein the angle $\theta_h$ between the direction of a first magnetic field formed through the one pair of pillar portions and the direction of a second magnetic field formed through the other pair of pillar portions is given by the following equation:

$$\theta_h = \sin^{-1}(\theta_{fMAX}/\theta_{f0})$$

where $\theta_{f0}$ is the Faraday rotation angle of the magneto-optical element in the case where the direction of a saturation combined magnetic field is parallel to the optical axis, and $\theta_{fMAX}$ is a maximal Faraday rotation angle of the magneto-optical element in the case of actual use.

14. The magneto-optical device according to claim 10, wherein, in the case where the direction of a saturation combined magnetic field is parallel to the optical axis of the magneto-optical element, the Faraday rotation angle of the magneto-optical element is set to 127.3° or larger, and the coils are driven by monopolar power supply units.

15. A magneto-optical device comprising:
a magnetic yoke having a tabular portion made of a semi-hard magnetic material and at least three pillar portions, protruding from one side of the tabular portion, that are made of a high-magnetic-permeability material;
coils wound around the pillar portions; and
a magneto-optical element arranged in an open-magnetic-circuit space surrounded by the respective top-end portions of the pillar portions, wherein magnetic fields generated through the coils are applied to the magneto-optical element.

16. A magneto-optical device comprising:
a magnetic yoke having a tabular portion made of a high-magnetic-permeability material and at least three pillar portions, protruding from one side of the tabular portion, that are made of a semi-hard magnetic material;
coils wound around the pillar portions; and
a magneto-optical element arranged in an open-magnetic-circuit space surrounded by the respective top-end portions of the pillar portions, wherein magnetic fields generated through the coils are applied to the magneto-optical element.

17. A self-latching variable optical attenuator for, with a light polarizer, a magneto-optical device, and an analyzer arranged in that order, controlling an attenuation value of output optical power versus input optical power, the magneto-optical device comprising:
a magnetic yoke having a tabular portion made of a semi-hard magnetic material and at least three pillar portions, protruding from one side of the tabular portion, that are made of a high-magnetic-permeability material;
coils wound around the pillar portions; and
a magneto-optical element arranged in an open-magnetic-circuit space surrounded by the respective top-end portions of the pillar portions, wherein magnetic fields generated through the coils are applied to the magneto-optical element.

18. A self-latching variable optical splitter, comprised of a magneto-optical device, a light polarizer, an analyzer, and a waveplate, for controlling optical separation ratio through the magneto-optical device, the magneto-optical device comprising:
a magnetic yoke having a tabular portion made of a semi-hard magnetic material and at least three pillar portions, protruding from one side of the tabular portion, that are made of a high-magnetic-permeability material;
coils wound around the pillar portions; and
a magneto-optical element arranged in an open-magnetic-circuit space surrounded by the respective top-end portions of the pillar portions, wherein magnetic fields generated through the coils are applied to the magneto-optical element.

19. A magneto-optical device comprising:
a magnetic yoke having a block-shaped base portion made of a semi-hard magnetic material and at least four pillar portions, made of a high-magnetic-permeability material, extending from the base portion to the vicinity of a space to be an open-magnetic-circuit space;
coils wound around the pillar portions; and
a magneto-optical element arranged in the open-magnetic-circuit space surrounded by the respective top-end portions of the pillar portions, wherein magnetic fields generated through the coils are applied to the magneto-optical element, in three or more directions.

* * * * *